(12) United States Patent
Iwaya et al.

(10) Patent No.: US 11,621,422 B2
(45) Date of Patent: Apr. 4, 2023

(54) ELECTRODE SLURRY, ELECTRODE AND PROCESS FOR PRODUCING THE SAME, AND SECONDARY BATTERY

(71) Applicants: DAICEL CORPORATION, Osaka (JP); DAICEL FINECHEM LTD., Tokyo (JP)

(72) Inventors: Masao Iwaya, Tokyo (JP); Shinya Ono, Himeji (JP); Naoki Doi, Himeji (JP)

(73) Assignees: DAICEL CORPORATION, Osaka (JP); DAICEL FINECHEM LTD., Tokyo (JP)

( * ) Notice: Subject to any disclaimer, the term of this patent is extended or adjusted under 35 U.S.C. 154(b) by 249 days.

(21) Appl. No.: 16/476,929

(22) PCT Filed: Jan. 10, 2018

(86) PCT No.: PCT/JP2018/000337
§ 371 (c)(1),
(2) Date: Jul. 10, 2019

(87) PCT Pub. No.: WO2018/135353
PCT Pub. Date: Jul. 26, 2018

(65) Prior Publication Data
US 2019/0334175 A1  Oct. 31, 2019

(30) Foreign Application Priority Data

Jan. 17, 2017 (JP) .............................. JP2017-006168
Jan. 17, 2017 (JP) .............................. JP2017-006169

(51) Int. Cl.

| | | |
|---|---|---|
| H01M 4/62 | (2006.01) | |
| H01M 4/587 | (2010.01) | |
| H01M 4/38 | (2006.01) | |
| H01M 10/0525 | (2010.01) | |
| H01M 4/133 | (2010.01) | |
| H01M 4/134 | (2010.01) | |
| C08L 1/28 | (2006.01) | |
| B05D 7/14 | (2006.01) | |
| H01M 4/04 | (2006.01) | |
| B05D 7/24 | (2006.01) | |
| H01M 4/583 | (2010.01) | |

(52) U.S. Cl.
CPC ........... *H01M 4/622* (2013.01); *H01M 4/133* (2013.01); *H01M 4/134* (2013.01); *H01M 4/386* (2013.01); *H01M 4/587* (2013.01); *H01M 10/0525* (2013.01); *B05D 7/14* (2013.01); *B05D 7/24* (2013.01); *C08L 1/286* (2013.01); *H01M 4/0404* (2013.01); *H01M 4/583* (2013.01); *H01M 4/621* (2013.01); *Y02E 60/10* (2013.01)

(58) Field of Classification Search
CPC . B05D 7/14; B05D 7/24; C08L 1/286; H01M 10/0525; H01M 4/0404; H01M 4/133; H01M 4/134; H01M 4/386; H01M 4/583; H01M 4/587; H01M 4/621; H01M 4/622; Y02E 60/10
See application file for complete search history.

(56) References Cited

U.S. PATENT DOCUMENTS

| | | | |
|---|---|---|---|
| 2009/0042100 A1 | 2/2009 | Tanaka et al. | |
| 2014/0248537 A1 | 9/2014 | Hayashi et al. | |
| 2015/0079439 A1 | 3/2015 | Iwasaki et al. | |
| 2016/0005551 A1* | 1/2016 | Ishii ..................... | H01M 4/62 |
| | | | 429/217 |
| 2016/0260973 A1 | 9/2016 | Sonobe et al. | |
| 2017/0200943 A1 | 7/2017 | Kawakami | |
| 2017/0317378 A1 | 11/2017 | Matsumura | |
| 2018/0108941 A1* | 4/2018 | Lee ...................... | H01M 4/626 |

FOREIGN PATENT DOCUMENTS

| | | |
|---|---|---|
| CN | 104466124 A | 3/2015 |
| JP | 2009-43641 A | 2/2009 |
| JP | 2016-21332 A | 2/2016 |
| JP | 2016-24985 A | 2/2016 |
| JP | 2016-100057 A | 5/2016 |
| WO | WO 2013/042720 A1 | 3/2013 |
| WO | WO 2014/133067 A1 | 9/2014 |
| WO | WO 2015/064464 A1 | 5/2015 |
| WO | WO 2015/141464 A1 | 9/2015 |
| WO | WO 2016/080145 A1 | 5/2016 |

OTHER PUBLICATIONS

International Search Report, issued in PCT/JP2018/000337, dated Mar. 13, 2018.
Written Opinion of the International Searching Authority, issued in PCT/JP2018/000337, dated Mar. 13, 2018.
English translation of International Preliminary Report on Patentability and Written Opinion dated Aug. 1, 2019, in PCT/JP2018/000337 (Forms PCT/IB/338, PCT/IB/373, and PCT/ISA/237).

* cited by examiner

*Primary Examiner* — Lingwen R Zeng
(74) *Attorney, Agent, or Firm* — Birch, Stewart, Kolasch & Birch, LLP

(57) ABSTRACT

An electrode slurry contains (A) a cellulose fiber, (B) a carboxymethyl-group-containing cellulose ether or a salt thereof, and a particulate material containing at least (C) an electrode active material, and the cellulose fiber (A) has an average fiber length of 1 to 750 µm. The amount of the carboxymethyl-group-containing cellulose ether or the salt thereof (B) is 0.1 to 3 parts by weight based on 100 parts by weight of the total amount of the cellulose fiber (A), the carboxymethyl-group-containing cellulose ether or the salt thereof (B), and the electrode active material (C), in terms of solid content. The present invention provides an electrode slurry that allows an improved surface smoothness (coating uniformity) of an electrode and an improved coating property, a process for producing the electrode slurry, an electrode, a process for producing the electrode, a non-aqueous secondary battery, and a lithium-ion secondary battery.

18 Claims, No Drawings

ELECTRODE SLURRY, ELECTRODE AND PROCESS FOR PRODUCING THE SAME, AND SECONDARY BATTERY

TECHNICAL FIELD

The present invention relates to an electrode slurry (or slurry composition) useful for forming an electrode of a non-aqueous secondary battery such as a lithium-ion battery, a process for producing the same, a non-aqueous secondary battery electrode prepared from the slurry composition and a process for producing the same, and a non-aqueous secondary battery.

BACKGROUND ART

In recent years, non-aqueous electrolyte secondary batteries (non-aqueous secondary batteries), typified by lithium-ion batteries with a high energy density and a high capacity, have been used widely as drive power sources for mobile terminal apparatuses such as mobile phones and laptop or tablet personal computers. Further, the mobile terminal apparatuses are to make higher in performance, smaller in size, and lighter in weight. The non-aqueous secondary batteries are increasingly used for electric vehicles (EV), plug-in hybrid electric vehicles (PHEV), hybrid electric vehicles (HEV), electric tools, household electricity storage applications, storage batteries for power leveling, and other applications. The non-aqueous secondary batteries are studied to have a higher capacity, a higher output, and a longer life. Meanwhile, the upgrading of such a non-aqueous secondary battery may cause a peeling off of an electrode coating layer from a current collector in an electrode plate production step or may encounter a separation between electrode active material particles and/or a peeling off of the electrode coating layer from the current collector by expansion and contraction of an electrode due to repeated charging and discharging, thus undesirably reducing the battery characteristics. These problems require a higher adhesion between the electrode active material particles and a higher adhesion between the electrode coating layer (electrode active material layer) and the current collector.

A carbon powder, which causes no internal short circuit due to growth of electrochemically deposited dendritic lithium, is conventionally used as an electrode material of a lithium-ion battery. Reported as a carbon powder that can occlude and release lithium ions are, for example, a coke, a graphite, and a baked product of an organic matter. In particular, a lithium-ion secondary battery using a graphite particle as a negative electrode active material is widely used because of a high safety and a high capacity thereof. Many recent studies report carbon coating of a positive electrode active material for increasing the conductivity of, particularly, an olivine-type positive electrode active material.

In the production of an electrode from a carbon powder, in a usually employed method, a carbon powder, a binder, and an organic solvent are kneaded to give a slurry, the slurry is applied on an electrode current collector, and the applied slurry is dried for solidification to bond the carbon powder to the current collector. Thus, the binder is required for the characteristics including, for example, a mechanical strength that does not lead to breakage of the electrode even by expansion and contraction of the electrode, a binding strength for binding the carbon powders each other and binding the carbon powder and the current collector, a withstand voltage characteristic, and an appropriate viscosity for a coating ink. Commonly used as the binder are, for example, a PVDF (polyvinylidene difluoride) and a PTFE (polytetrafluoroethylene). The binder such as the PVDF needs in use to be dissolved in an organic solvent such as N-methylpyrrolidone (NMP), thus increasing the cost high and increasing adverse effects on the environment. To overcome such problems, also reported is a combination use of an aqueous dispersion of a styrene-butadiene rubber (SBR) latex instead of the PVDF-NMP-based binder as the binder and a highly hydrophilic carboxymethyl cellulose (CMC) as a thickening agent.

However, particularly in the use of the CMC as a thickening agent of a negative electrode, it has been found that the adhesion between the negative electrode active material layer and the current collector is mainly increased by the CMC. For example, Japanese Patent Application Laid-Open Publication No. 2009-43641 (JP 2009-43641 A, Patent Document 1) discloses a negative electrode for a non-aqueous electrolyte battery; the negative electrode comprises a negative electrode active material layer, formed on a surface of a negative electrode current collector, containing a negative electrode active material and an aqueous binder for a negative electrode active material layer, wherein a porous layer containing an inorganic fine particle and a non-aqueous binder for a porous layer is formed on a surface of the negative electrode active material layer, and the binder for the negative electrode active material layer contains a CMC having a degree of etherification of not less than 0.5 and not more than 0.75. In Examples of this document, a CMC and an SBR are used in combination as the binder for the negative electrode.

Unfortunately, the combination of the CMC or a salt thereof and the SBR has insufficient adhesion between the electrode active material layer and the current collector to meet the recent higher demand. Further, such a combination fails to increase a discharge capacity.

Further, a method of using a cellulose as a binder of a carbon powder that is an electrode active material of a lithium secondary battery is also studied. Japanese Patent Application Laid-Open Publication No. 2000-100439 (JP 2000-100439 A, Patent Document 2) discloses a binder containing a cellulose such as a regenerated cellulose.

However, this document fails to disclose the fiber diameter or fiber length of the cellulose.

WO 2013/042720 (Patent Document 3) discloses a fine cellulose fiber as an aqueous binder for forming an electrode of a lithium secondary battery. The document also discloses that the fine cellulose fiber has a fiber diameter of 0.001 to 10 μm and an aspect ratio (L/D) of 10 to 100,000. Moreover, the document discloses that the binder may contain a water-soluble polymer, as a dispersing agent, such as a methyl cellulose, a carboxymethyl cellulose (CMC), a polyethylene glycol, a polyvinyl alcohol, a polyvinylpyrrolidone, a polyacrylic acid, or a styrene-butadiene rubber. Moreover, Examples of the document reports that a lithium-titanium composite oxide (LTO) that has no or less volume change due to charging and discharging, an acetylene black, and a cellulose fiber aqueous dispersion are mixed to give a slurry composition and that this composition shows a high charge-discharge capacity in comparison with Comparative Example 1 using a carboxymethyl cellulose instead of the cellulose fiber. Further, Examples of this document disclose that a cellulose fiber obtained by refining a cellulose powder is used to produce an electrode having a thickness of 7 μm.

Unfortunately, this document fails to disclose a combination of a fine cellulose and a carboxymethyl cellulose.

Moreover, this document is silent on an average fiber length of the commercially-available cellulose powder used in Examples. Further, the electrode having a thickness of 7 μm has a low surface smoothness due to a fluffed surface thereof. Thus, the electrode may have a low external appearance, and in addition, a projecting cellulose fiber may pierce a separator to cause short circuit of the separator. Moreover, the fluffed surface of the electrode forms a gap between the electrode and the separator, decreasing a packing density of an electrode active material and reducing a capacity density of a battery.

Further, for the secondary battery described in this document, it is difficult to significantly improve the discharge capacity and cycle characteristics. Moreover, probably because the secondary battery still has an insufficient energy density of an active material, it is also difficult to improve the capacity of the battery.

CITATION LIST

Patent Literature

Patent Document 1: JP 2009-43641 A (Claims, paragraph [0016], and Examples)
Patent Document 2: JP 2000-100439 A (claim 1 and Examples)
Patent Document 3: WO 2013/042720 (claim 1 and paragraphs [0024], [0047], and [0048])

SUMMARY OF INVENTION

Technical Problem

It is therefore an object of the present invention to provide an electrode slurry that allows an improved surface smoothness (coating uniformity) and an improved coating property (coatability), a process for producing the electrode slurry, an electrode, a process for producing the electrode, a non-aqueous secondary battery, and a lithium-ion secondary battery.

Another object of the present invention is to provide an electrode slurry (or slurry composition) that increases or improves adhesion of a negative electrode active material to a current collector, a process for producing the electrode slurry (or slurry composition), an electrode, a process for producing the electrode, a non-aqueous secondary battery, and a lithium-ion secondary battery.

It is still another object of the present invention to provide an electrode slurry (or slurry composition) useful for forming an electrode that has an improved discharge capacity and maintains a high discharge capacity after repeated charging and discharging, a process for producing the electrode slurry (or slurry composition), an electrode prepared from the slurry, a process for producing the electrode, a non-aqueous secondary battery, and a lithium-ion secondary battery.

Solution to Problem

The inventors of the present invention made intensive studies to achieve the above objects and found that (i) a combination of a specific cellulose fiber, a carboxymethyl-group-containing cellulose ether or a salt thereof, and an electrode active material improves a surface smoothness (coating uniformity) and a coating property (coatability) and enables an increased or improved adhesion of a negative electrode active material to a current collector and (ii) the carboxymethyl cellulose or the salt thereof is useful for protecting a surface of an electrode containing the electrode active material probably because the carboxymethyl cellulose or the salt thereof coats or covers (or adheres to) the electrode, and the cellulose fiber is useful for retaining the electrode active material with a high binding strength even in a case where the electrode expands and contracts due to charging and discharging. Based on the above findings, a slurry composition was prepared on the presumption that a combination of the carboxymethyl cellulose or the salt thereof and the cellulose fiber allows the formation of a further effective electrode. However, it was found that, probably because of localization of the carboxymethyl cellulose or the salt thereof near the cellulose fiber due to a high affinity between the both, the combination of the carboxymethyl cellulose or the salt thereof and the cellulose fiber fails to effectively protect the electrode and reduces a discharge capacity and fails to maintain a high discharge capacity due to reduced cycle characteristics. The inventors of the present invention further made intensive studies based on these findings and finally found that the addition of a carboxymethyl cellulose or a salt thereof to a mixed system of an electrode active material and a cellulose fiber fails to improve cycle characteristics or other characteristics, and that the addition of a cellulose fiber (or an aqueous dispersion of a cellulose fiber) to a mixed system of an electrode active material and a carboxymethyl cellulose or a salt thereof improves a discharge capacity and maintains a high discharge capacity after repeated charging and discharging, probably because the electrode active material is pre-coated with or pre-adsorbed to the carboxymethyl cellulose or the salt thereof. The present invention was accomplished based on the above findings.

That is, the present invention includes an electrode slurry (slurry composition) comprising (A) a cellulose fiber, (B) a carboxymethyl-group-containing cellulose ether or a salt thereof, and a particulate material containing at least (C) an electrode active material; the cellulose fiber (A) has an average fiber length of 1 to 750 μm.

The amount of the carboxymethyl-group-containing cellulose ether or the salt thereof (B) may be about 0.1 to 3 parts by weight based on 100 parts by weight of the total amount of the cellulose fiber (A), the carboxymethyl-group-containing cellulose ether or the salt thereof (B), and the electrode active material (C), in terms of solid content.

In the electrode slurry, the total content of the cellulose fiber (A) and the carboxymethyl-group-containing cellulose ether or the salt thereof (B) may be about 1 to 4.5 parts by weight based on 100 parts by weight of the total amount of the cellulose fiber (A), the carboxymethyl-group-containing cellulose ether or the salt thereof (B), and the electrode active material (C), in terms of solid content. The ratio of the cellulose fiber (A) relative to the carboxymethyl-group-containing cellulose ether or the salt thereof (B) may be 95/5 to 20/80 in the former/the latter (weight ratio) in terms of solid content. The average fiber length of the cellulose fiber (A) may be about 2 to 100 μm. The carboxymethyl-group-containing cellulose ether or the salt thereof (B) may contain a carboxymethyl cellulose or a salt thereof. In the slurry composition and the electrode, at least the electrode active material (C) of the particulate material seems to be coated or covered with the carboxymethyl-group-containing cellulose ether (salt) (B). Specifically, the electrode active material (C) may be coated or covered with the carboxymethyl-group-containing cellulose ether or the salt thereof (B).

The electrode active material (C) may contain at least one member selected from the group consisting of a carbonaceous particle and a silicon particle. For example, the electrode active material (C) may contain at least the carbonaceous material or may contain the carbonaceous particle and the silicon particle. The ratio of the carbonaceous particle relative to the silicon particle may be selected from a range of 100/0 to 0/100 in the former/the latter and may be about 99/1 to 50/50 (weight ratio) (for example, about 98/2 to 70/30 (weight ratio)). The total content of the cellulose fiber (A), the carboxymethyl-group-containing cellulose ether or the salt thereof (B), and the particulate material containing at least the electrode active material (C) may be not more than 60% by weight based on the whole slurry.

The slurry composition (or electrode slurry) of the present invention may be prepared by mixing the components (A), (B), and (C). For example, the slurry composition (or electrode slurry) contains the particulate material containing at least the electrode active material (C), the carboxymethyl-group-containing cellulose ether or the salt thereof (B), and the cellulose fiber (A) and may be produced by treating (or premixing or premix-treating) at least the electrode active material (C) of the particulate material with the carboxymethyl-group-containing cellulose ether or the salt thereof (B) and mixing the cellulose fiber (A) therewith. The present invention also includes thus obtainable slurry composition.

In the slurry composition, the particulate material may further contain (D) a conductive auxiliary. Such a composition may be prepared by treating (or premixing or premix-treating) the electrode active material (C) and the conductive auxiliary (D) with the carboxymethyl-group-containing cellulose ether or the salt thereof (B) and mixing the cellulose fiber (A) therewith.

In the particulate material, the treatment of at least the electrode active material (C) (or the particulate material containing the electrode active material (C) and the conductive auxiliary (D)) may usually be carried out in an aqueous medium. The carboxymethyl-group-containing cellulose ether or the salt thereof (B) may be used in the form of a solid such as a powder form or in the form of an aqueous solution. Moreover, the cellulose fiber (A) may be used in the form of an aqueous dispersion.

The electrode active material (C) may contain at least one active material selected from the group consisting of (C1) a carbonaceous particle and (C2) a silicon particle, for example, may contain at least the carbonaceous particle (C1) or may contain the carbonaceous particle (C1) and the silicon particle (C2) The carboxymethyl-group-containing cellulose or the salt thereof (B) may contain, for example, a carboxymethyl cellulose or a salt thereof. Further, the average fiber length of the cellulose fiber (A) may be, for example, about 1 to 750 μm (e.g., about 2 to 100 μm).

More specifically, (C) an electrode active material containing (C1) a carbonaceous particle and (C2) a silicon particle in a ratio of the former/the latter of 99/1 to 50/50 (weight ratio), (B) a carboxymethyl cellulose or a salt thereof, and optionally (B) a conductive auxiliary may be mixed to prepare an aqueous mixture, and the aqueous mixture and an aqueous dispersion containing (A) a cellulose nanofiber having a nanometer-sized average fiber diameter may be mixed to prepare the slurry composition. In this process, the carboxymethyl cellulose or salt thereof (B) may be mixed in an amount of 0.1 to 4 parts by weight based on 100 parts by weight of the electrode active material (C) in terms of solid content. Moreover, the cellulose nanofiber (A) and the carboxymethyl cellulose or the salt thereof (B) may be mixed in a ratio of the former/the latter (weight ratio) of 95/5 to 5/95 in terms of solid content.

The present invention also includes a process for forming or producing a non-aqueous secondary battery electrode (for example, a positive electrode or negative electrode of a lithium-ion secondary battery), the process comprising: applying the electrode slurry (or slurry composition) on a current collector. Further, the present invention includes a process for producing a non-aqueous secondary battery (for example, a lithium-ion secondary battery) provided with thus produced electrode.

The present invention also includes a non-aqueous secondary battery electrode (for example, a positive electrode or negative electrode of a lithium-ion secondary battery) comprising a current collector and an electrode active material layer on at least one surface of the current collector, the electrode active material layer containing (A) a cellulose fiber, (B) a carboxymethyl-group-containing cellulose ether or a salt thereof, and (C) an electrode active material.

The present invention includes a non-aqueous secondary battery (for example, a lithium-ion secondary battery) provided with the electrode.

In the present invention, the terms "electrode slurry" and "slurry" mean a slurry for forming an electrode active material layer. The term "metal particle" or "silicon particle" is not limited to a particle of "metal" or "silicon" simple substance and may also include any alloy particle (such as a silicon alloy particle) and composite particle (such as a silicon composite particle) as far as such a particle contains "metal" or "silicon" as a main component.

Advantageous Effects of Invention

The present invention improves the surface smoothness (coating uniformity) and the coating property (coatability) due to the combination of the cellulose fiber and the carboxymethyl-group-containing cellulose ether or the salt thereof. Further, the adhesion of the negative electrode active material to the current collector can be improved.

Further, according to the present invention, because of preparing the slurry composition by the specific process, a discharge capacity is significantly improved and a high discharge capacity is maintained after repeated charging and discharging. Moreover, a high adhesion to the current collector is maintained even if the electrode active material layer contains the electrode active material showing large expansion and contraction due to charging and discharging and having a high energy density.

DESCRIPTION OF EMBODIMENTS

[Electrode Slurry]

The electrode slurry of the present invention contains (A) a cellulose fiber, (B) a carboxymethyl-group-containing cellulose or a salt thereof [a carboxymethyl-group-containing cellulose ether (salt)], and a particulate material containing at least (C) an electrode active material. The particulate material may further contain (B) a conductive auxiliary.

[(A) Cellulose Fiber]

The electrode slurry of the present invention, containing the cellulose fiber, increases adhesion of the electrode active material to a current collector probably because the cellulose fiber can bond the electrode active materials by linear adhesion (or the cellulose fiber or binder can function as a fibrous binder between adjacent electrode active materials to crosslink and bond the electrode active materials). The cellulose fiber is a strong and tough fiber, and, in the electrode containing the electrode active material (for example, a negative electrode containing a graphite particle and a silicon particle), the cellulose fiber can follow expansion and contraction of an electrode active material and an electrode to maintain a strong binding strength, and has an advantage over a conventional rubber-series binder (e.g., a styrene-butadiene rubber). In particular, an entangled state of the cellulose fiber prevents the falling off of a particulate material (particularly a fine particulate active material) such as (C) an electrode active material, in particular, a fine particulate active material (e.g., a silicon particle) and improves adhesion to the current collector.

The cellulose fiber has an average fiber length that may be selected from a wide range of 0.1 to 1000 μm; for example, the average fiber length may be about 1 to 750 μm (e.g., about 1.2 to 600 μm), preferably about 1.3 to 500 μm (e.g., about 1.5 to 100 μm), more preferably about 1.4 to 250 μm (e.g., about 1.6 to 50 μm), and particularly about 1.8 to 25 μm, and may usually be about 2 to 100 μm (e.g., about 3 to 50 μm, preferably about 5 to 30 μm). The cellulose fiber having too large a fiber length may fluff on a surface of an electrode and fail to improve a surface smoothness (coating uniformity) of the electrode. The cellulose fiber having too small a fiber length may fail to improve the adhesion of the electrode active material to the current collector.

The fiber length of the cellulose fiber may be uniform. The coefficient of variation of the fiber length ([standard deviation of fiber length/average fiber length]×100) may be, for example, about 0.1 to 100, preferably about 0.5 to 50, and more preferably about 1 to 30. The cellulose fiber may have a maximum fiber length of, for example, not more than 500 μm, preferably not more than 300 μm, more preferably not more than 200 μm, particularly not more than 100 μm, and usually not more than 50 μm.

It is advantageous to control the average fiber length of the cellulose fiber to 5 times or less as large as the average thickness of an electrode active material layer in view of a further improved surface smoothness (coating uniformity) and a further improved adhesion of the electrode active material to the current collector. The average fiber length of the cellulose fiber may be, for example, about 0.01 to 5 times, preferably about 0.02 to 3 times, and more preferably about 0.03 to 2 times as large as the average thickness of the electrode active material layer.

The cellulose fiber may have an average fiber diameter of, for example, about 1 nm to 10 μm (e.g., about 4 nm to 5 μm), preferably about 5 nm to 2.5 μm (e.g., about 10 nm to 1 μm), and more preferably about 20 to 700 nm (e.g., about 25 to 500 nm). The average fiber diameter may be about 30 to 200 nm (e.g., about 50 to 100 nm). In a case where the fiber diameter of the cellulose fiber is too large, the packing density of the electrode active material may be reduced due to a large occupation volume of the fiber. The cellulose fiber (A) may preferably include a cellulose nanofiber having a nanometer-sized average fiber diameter (for example, a cellulose nanofiber having an average fiber diameter of about 10 to 500 nm, preferably about 25 to 250 nm).

The fiber diameter of the cellulose fiber may also be uniform. The coefficient of variation of the fiber diameter ([standard deviation of fiber diameter/average fiber diameter]×100) may be, for example, about 1 to 80, preferably about 5 to 60, and more preferably about 10 to 50. The cellulose fiber may have a maximum fiber diameter of, for example, not more than 30 μm, preferably not more than 5 μm, and more preferably not more than 1 μm.

The ratio (aspect ratio) of the average fiber length relative to the average fiber diameter of the cellulose fiber may be, for example, about 10 to 5000, preferably about 20 to 3000, and more preferably about 50 to 2000 (e.g., about 100 to 1500). If the aspect ratio of the cellulose fiber is too small, the cellulose fiber may reduce the adhesion of the electrode active material to the current collector. If the aspect ratio of the cellulose fiber is too large, the cellulose fiber may decrease in the breaking strength of the fiber or may fluff on a surface of an electrode and reduce a surface smoothness (coating uniformity) of the electrode.

In the present invention, the average fiber length, the standard deviation of the fiber length distribution, the maximum fiber length, the average fiber diameter, the standard deviation of the fiber diameter distribution, and the maximum fiber diameter may be values determined from fibers (n=about 20) based on an electron micrograph.

The material of the cellulose fiber contains (or is composed of) a polysaccharide having a β-1,4-glucan structure. The cellulose fiber may include a cellulose fiber derived from a higher plant [for example, a natural cellulose fiber (pulp fiber), such as a wood fiber (e.g., a wood pulp made from a coniferous tree or a broad-leaved tree), a bamboo fiber, a sugar cane fiber, a seed-hair fiber (e.g., a cotton linter, a bombax cotton, and a kapok), a bast fiber (e.g., a hemp, a kozo (a paper mulberry), and a mitsumata plant (an oriental paperbush)), or a leaf fiber (e.g., a Manila hemp and a New Zealand flax)], a cellulose fiber derived from an animal (e.g., a tunicate (or ascidian) cellulose), a cellulose fiber derived from a bacterium (e.g., a cellulose contained in nata de coco), and a chemically synthesized cellulose fiber [for example, a rayon, a cellulose ester (such as a cellulose acetate), and a cellulose ether derivative, e.g., a hydroxyalkyl cellulose (such as a hydroxyethyl cellulose (HEC) or a hydroxypropyl cellulose); an alkyl cellulose (such as a methyl cellulose or an ethyl cellulose)]. These cellulose fibers may be used alone or in combination.

Among these cellulose fibers, a preferred one includes a cellulose fiber derived from a pulp, for example, the cellulose fiber derived from the higher plant, such as a wood fiber (e.g., a wood pulp made from a coniferous tree or a broad-leaved tree) or a seed-hair fiber (e.g., a cotton linter), in view of easy preparation of a nanofiber having an appropriate aspect ratio.

The process for producing the cellulose fiber is not particularly limited to a specific one. According to desired fiber length and fiber diameter, used may be a conventional process, for example, a process described in Japanese Examined Patent Application Publication No. 60-19921 or Japanese Patent Application Laid-Open Publication No. 2011-26760, 2012-25833, 2012-36517, 2012-36518, or 2014-181421.

[(B) Carboxymethyl-Group-Containing Cellulose Ether or Salt Thereof (Hereinafter, which May be Referred to as Carboxymethyl-Group-Containing Cellulose Ether (Salt))]

The electrode slurry of the present invention contains a carboxymethyl-group-containing cellulose ether (salt). The carboxymethyl-group-containing cellulose ether (salt) functions as a binder (or a bonding agent) and can function as not only a thickening agent but also a dispersing agent. Thus, a combination of the cellulose fiber and the carboxymethyl-group-containing cellulose ether (salt) allows an improved coating property (coatability) (for example, easy coating) probably because of optimal modification of the viscosity of the slurry due to a thickening action of the carboxymethyl-group-containing cellulose ether (salt) and also allows an improved adhesion of the electrode active material to the current collector. Moreover, the carboxymethyl-group-containing cellulose ether (salt) allows an improved surface smoothness of a coating layer (coating uniformity) probably because the carboxymethyl-group-containing cellulose ether (salt) functions as a protective colloid to enable the electrode active material to be dispersed stably. Further, the carboxymethyl-group-containing cellulose ether (salt) also has a function of preventing or reducing decomposition of an electrolytic solution on a surface of an electrode probably because the cellulose ether (salt) covers or coats (or adheres to) the surface of the electrode. In particular, even in a case where the cellulose fiber is used as a binder, a combination use of the carboxymethyl-group-containing cellulose ether (salt) is preferred in order to form a homogeneous electrode layer with a high adhesive strength. The cellulose fiber has a high binding strength, while an electrode with the cellulose fiber alone as a binder tends to lower in uniformity of the electrode.

The carboxymethyl-group-containing cellulose ether may include, for example, a carboxymethyl cellulose (CMC), an alkyl carboxymethyl cellulose (such as a methyl carboxymethyl cellulose), and a hydroxyalkyl carboxymethyl cellulose (such as a hydroxyethyl carboxymethyl cellulose or a hydroxypropyl carboxymethyl cellulose). These carboxymethyl-group-containing cellulose ethers may be used alone or in combination.

Among these carboxymethyl-group-containing cellulose ethers, the carboxymethyl cellulose (CMC) is preferred.

The carboxymethyl-group-containing cellulose ether (such as the CMC) has any average degree of etherification (an average degree of etherification of carboxymethyl group) (or an average degree of substitution, DS) that can express an appropriate water solubility and viscosity in water to improve the coating property (coatability) of the composition. The average degree of etherification may be selected from a wide range of about 0.1 to 3 and may be preferably about 0.2 to 2, and more preferably about 0.5 to 1.2. The term "average degree of substitution" means an average of a substitution degree (a substitution rate, particularly a substitution degree of carboxymethyl groups which may form salts) with respect to hydroxyl groups on 2—, 3—and 6-positions of a glucose unit constituting a cellulose, and the maximum value of the average degree of substitution is 3.

The carboxymethyl-group-containing cellulose ether (particularly the CMC) may form a salt. The salt may include, for example, a monovalent metal salt such as an alkali metal salt (e.g., a lithium salt, a sodium salt, a potassium salt, a rubidium salt, and a cesium salt) a divalent metal salt such as an alkaline earth metal salt (e.g., a calcium salt and a magnesium salt), a quaternary ammonium salt, an amine salt, a substituted amine salt, or double salts thereof. The salt (CMC salt) preferably includes an alkali metal salt such as a sodium salt, a quaternary ammonium salt, particularly an alkali metal salt such as a sodium salt.

According to the present invention, the carboxymethyl-group-containing cellulose ether (particularly the CMC) may be in the form of a salt considering water solubility or others or may be a partial acid-type or fully acid-type CMC.

The average degree of polymerization (viscosity-average degree of polymerization) of the carboxymethyl-group-containing cellulose ether (particularly the CMC) or the salt thereof is not particularly limited to a specific one and, for example, may be about 10 to 1000, preferably about 50 to 900, and more preferably about 100 to 800.

The ratio of the cellulose fiber (A) relative to the carboxymethyl-group-containing cellulose ether (salt) (B) may be selected from a wide range of 99/1 to 1/99 (e.g., 99/1 to 10/99) in the former/the latter (weight ratio) in terms of solid content; for example, the ratio may be about 95/5 to 5/95 (e.g., about 95/5 to 20/80), preferably about 90/10 to 10/90 (e.g., about 90/10 to 25/75), more preferably about 85/15 to 20/80 (e.g., about 85/15 to 30/70), particularly about 80/20 to 30/70 (e.g., about 80/20 to 33/67), and usually about 75/25 to 35/65. In a case where the ratio of the carboxymethyl-group-containing cellulose ether (salt) relative to the cellulose fiber is too low, the electrode active material may fail to be dispersed uniformly and thus the surface smoothness (coating uniformity) may fail to be improved. In a case where the ratio of the carboxymethyl-group-containing cellulose ether (salt) relative to the cellulose fiber is too high, the slurry may have a high viscosity, thus failing to improve in coating property or making the binding strength insufficient.

[(C) Electrode Active Material]

The electrode active material may be selected according to the species of a non-aqueous secondary battery. The electrode active material may include, for example, a carbonaceous or carbon material (carbon), a metal simple substance, a silicon simple substance (silicon), a silicon compound [e.g., a silicon oxide such as SiO or silica, and a metal silicate (such as calcium silicate, aluminum silicate, magnesium silicate, or magnesium aluminosilicate)], a mineral substance (such as a zeolite, a diatomaceous earth, a baked diatomaceous earth, a talc, a kaolin, a sericite, a bentonite, a smectite, or a clay), a metal carbonate (such as magnesium carbonate, heavy calcium carbonate, or light calcium carbonate), a metal oxide (such as alumina, zinc oxide, manganese dioxide, titanium dioxide, lead dioxide, silver oxide, nickel oxide, or lithium composite oxide), a metal hydroxide (such as aluminum hydroxide, calcium hydroxide, magnesium hydroxide, nickel hydroxide, or cadmium hydroxide), and a metal sulfate (such as calcium sulfate or barium sulfate). These electrode active materials may be used alone or in combination.

Among these electrode active materials, the metal oxide, the metal (such as a silicon simple substance), the silicon compound, and the carbonaceous material are preferred. Specifically, for an electrode active material that is used for a lithium-ion battery, widely used as a positive electrode active material is a metal oxide; and widely used as a negative electrode active material are a silicon particle (a particle such as a silicon simple substance, a silicon alloy, a silicon composite, or a silicon compound), a carbonaceous (particularly a graphite) particle, and a metal oxide particle.

As the metal oxide other than the silicon oxide, there may be used the lithium composite oxide [for example, $LiCo_{1-a-b-c}Ni_aMn_bAl_cO_2$ (where $0 \leq a \leq 1$, $0 \leq b \leq 1$, $0 \leq c \leq 1$, $a+b+c \leq 1$), $LiMn_2O_4$, $Li_4Ti_5O_{12}$, and $LiFePO_3$]. These metal oxides may be used alone or in combination. Among these metal oxides, in view of excellent charge-discharge characteristics, a preferred one includes a lithium composite oxide such as lithium titanate ($Li_4Ti_5O_{12}$), olivine iron ($LiFePO_3$), or $LiCo_{1-a-b-c}Ni_aMn_bAl_cO_2$ (where $0 \leq a \leq 1$, $0 \leq b \leq 1$, $0 \leq c \leq 1$, $a+b+c \leq 1$).

The metal may be, for example, a metal simple substance, a metal alloy, and a metal composite. Such a metal may include, for example, silicon. Examples of the silicon particle may include an inorganic particle containing silicon as a main component (for example, not less than 35% by weight of the total, preferably not less than 50% by weight of the total, and more preferably not less than 70% by weight of the total). As the particle of the silicon simple substance, for example, a silicon particle such as an amorphous silicon or a low-crystalline silicon may be used. Examples of the particle of the silicon alloy may include an alloy particle of silicon and a transition metal, such as a silicon-tin alloy SiSn, a silicon-titanium alloy SiTi, or a silicon-tin-titanium alloy (SiSnTi). The particle of the silicon composite may include, for example, a composite particle of silicon and silicon monoxide SiO. Examples of the particle of the silicon compound may include a particle of a silicon oxide (a silicon oxide particle such as silicon monoxide SiO or silica) and a particle of a silicon carbide (SiC). These silicon particles may be used alone or in combination. A preferred silicon particle may include, for example, the silicon simple substance (silicon) particle, the alloy particle, the composite particle, the silicon monoxide SiO particle, and the silicon carbide (SiC) particle.

The carbonaceous (or carbon) material may include, for example, a natural or artificial graphite, an expandable graphite, an easily-graphitizable carbon, a hardly-graphitizable carbon, a mesocarbon microbead (MCMB), a pitch-based carbon, and a coke powder. These carbonaceous materials may be used alone or in combination. Among these carbonaceous materials, the natural or artificial graphite is preferred in view of excellent charge-discharge characteristics.

Among these electrode active materials, the carbonaceous material, the silicon, and the metal oxide are used widely. In particular, the electrode active material usually contains at least one active material particle of (C1) a carbonaceous material and (C2) a silicon having a high energy density (at least one electrode active material particle selected from the group consisting of (C1) a carbonaceous particle and (C2) a silicon particle) In a combination of a plurality of electrode active material particles, the electrode active material usually contains the carbonaceous particle (C1) as at least a first active material particle. The electrode active material preferably contains both of the carbonaceous particle (C1) as a first active material particle and the silicon particle (C2) as a second active material particle for improving the adhesion to the current collector without lowering of the charge-discharge efficiency of the silicon particle.

Among these electrode active materials, the carbonaceous (or carbon) particle is preferred for markedly expressing a linear adhesion effect of the cellulose fiber and significantly improving an adhesion to a current collector, and the silicon particle is preferred in order to increase a discharge capacity. That is, it is preferred that the electrode active material contain the carbonaceous particle and the silicon particle. The carbonaceous (or carbon) material may form a silicon composite particle with silicon and silicon monoxide, as described in Japanese Patent Application Laid-Open Publication No. 2016-100054.

Incidentally, in a case where a plurality of electrode active materials is used in combination, as the electrode active material, a plurality of electrode active material particles with substantially the same average particle size may be combined, or a first electrode active material having a larger average particle size and a second electrode active material having a smaller average particle size may be combined.

The shape of the electrode active material is not particularly limited to a specific one and may be, for example, an amorphous form, a fibrous form, an ellipsoidal form, a spherical form, a plate-like form (or flat form), a flake form (or scale-like form), and a powder or particulate form. The electrode active material may usually be employed in a particulate (or particle) form.

The average particle size (D50) of the electrode active material (particularly the carbonaceous material) measured using a laser diffraction particle size analyzer may be, for example, about 1 to 100 µm, preferably about 2 to 50 µm, more preferably about 3 to 40 µm, and particularly about 5 to 30 µm. In a case where the electrode active material (particularly the carbonaceous material) is in a flat form or shape, the average particle size means an average diameter of the major axis and the minor axis in the plane form or shape.

The silicon particle has an average particle size that may be selected from a range of, for example, about 1 nm to 5 µm (particularly about 1 nm to 1 µm). The average particle size may usually be about 2 to 700 nm (e.g., about 5 to 500 nm), preferably about 10 to 300 nm (e.g., about 20 to 200 nm), and more preferably about 25 to 150 nm (e.g., about 30 to 120 nm) or may be about 10 to 100 nm (e.g., about 40 to 80 nm). In particular, the average particle size of the silicon particle is preferably a nanometer size. The average particle size of the silicon particle can be measured by a conventional method according to the particle size. The average particle size may be measured using a laser diffraction particle size analyzer or may be determined by analyzing an image based on an electron microscope to calculate an average particle size of 100 particles.

The ratio of the first active material particle (e.g., the carbonaceous particle) relative to the second active material particle (e.g., the silicon particle) is not particularly limited to a specific one, and the former/the latter (weight ratio) may be selected from a wide range of about 99/1 to 0/100 (for example, about 98/2 to 10/90) and may usually be about 99/1 to 40/60 (e.g., about 99/1 to 50/50), preferably about 98/2 to 70/30 (e.g., about 95/5 to 75/25), and more preferably about 95/5 to 80/20 (e.g., about 93/7 to 85/15). A higher ratio of the silicon particle allows a higher discharge capacity.

The relationship between the average particle size $D_c$ of the first active material particle (e.g., the carbonaceous particle) and the average particle size $D_{Si}$ of the second active material particle (e.g., the silicon particle) is not particularly limited to a specific one. The relationship between the above average particle sizes may be $D_{Si} \geq D_c$. In a case where the electrode active material layer is formed in the form in which the second active material particle (for example, the silicon particle) enters a gap (or void) among the first active material particles (for example, the carbonaceous particles), the cellulose fiber prevents or absorbs expansion and contraction of the electrode active material layer due to expansion and contraction of the second active material particle (for example, the silicon particle), probably because the cellulose fiber linearly bonds the first active material particle (for example, the carbonaceous particle). The prevention or absorption increases the adhesion of the electrode active material layer to the current collector while retaining or maintaining a high discharge capacity. Thus, it is advantageous that the average particle size $D_{Si}$ of the second active material particle (for example, the silicon particle) is smaller than the average particle size $D_c$ of the first active material particle (for example, the carbonaceous particle) ($D_{Si} < D_c$).

The ratio $D_c/D_{Si}$ of the average particle size $D_c$ of the first active material particle (for example, the carbonaceous particle) relative to the average particle size $D_{Si}$ of the second active material particle (for example, the silicon particle) may be, for example, about 5 to 1000 (e.g., about 10 to 800), preferably about 50 to 750 (e.g., about 100 to 700), and more preferably about 150 to 650 (e.g., about 200 to 600) or may be about 250 to 550 (e.g., about 300 to 500).

In the slurry composition and the electrode, at least the electrode active material (C) in the particulate material is probably coated with the carboxymethyl-group-containing cellulose ether (salt) (B).

[(D) Conductive Auxiliary]

A conductive auxiliary is not necessarily needed. In order to improve the electrode conductivity, the electrode active material may contain the conductive auxiliary [for example, an electroconductive carbon black such as a carbon black (e.g., acetylene black, thermal black, furnace black, and Ketjen black), a carbon fiber such as a VGCF (a vapor-grown carbon fiber), a carbon nanofiber, and a carbon nanotube], a graphene, or others. These conductive auxiliaries may be used or in combination. A preferred conductive auxiliary includes acetylene black.

[Rubber Component]

Though a rubber component is not necessarily needed, the electrode slurry may further contain the rubber component. Examples of the rubber component may include a diene-series rubber, an olefin-series rubber, a polyester-series rubber, a polyamide-series rubber, a silicone-series rubber, or thermoplastic elastomers corresponding to these rubbers. These rubber components may be used alone or in combination.

Among these rubber components, the diene-series rubber (for example, a natural rubber, an isoprene rubber, a butadiene rubber, a chloroprene rubber, a styrene-diene copolymer rubber (e.g., a styrene-butadiene rubber, a styrene-chloroprene rubber, and a styrene-isoprene rubber)) is preferred. The styrene-diene copolymer rubber is more preferred. A combination of the cellulose fiber and the rubber component is advantageous in the respects that can impart a flexibility to the electrode and can prevent the electrode from breaking and separating from the current collector in winding operation of a battery cell.

The electrode slurry may optionally contain a conventional additive (for example, a surfactant, a dispersing agent, a film-forming auxiliary, an antifoaming agent, a leveling agent, a flame retardant, a tackifier, a thickening agent, a heat stabilizer, and a filler).

[Proportion of Each Component]

The amount of the cellulose fiber (A) based on 100 parts by weight of the electrode active material (C) may be selected from a wide range of 0.01 to 5 parts by weight in terms of solid content; and from the viewpoint of improving the adhesion of the electrode active material to the current collector, the amount may be about 0.1 to 4.5 parts by weight, preferably about 0.15 to 4 parts by weight (e.g., about 0.2 to 3.5 parts by weight), more preferably about 0.25 to 3 parts by weight (e.g., about 0.27 to 2.8 parts by weight), particularly about 0.3 to 2.5 parts by weight (e.g., about 0.4 to 2.3 parts by weight), and usually about 0.45 to 2.2 parts by weight (e.g., about 0.5 to 2 parts by weight).

The amount of the cellulose fiber (A) based on 100 parts by weight of the total amount of the cellulose fiber (A), the carboxymethyl-group-containing cellulose ether (salt) (B), and the electrode active material (C) may be selected from a wide range of 0.01 to 5 parts by weight in terms of solid content; and from the viewpoint of improving the adhesion of the electrode active material to the current collector, the amount may be, for example, about 0.1 to 4 parts by weight, preferably about 0.15 to 3.5 parts by weight (e.g., about 0.2 to 3.2 parts by weight), more preferably about 0.25 to 3 parts by weight (e.g., about 0.27 to 2.6 parts by weight), particularly about 0.3 to 2.5 parts by weight (e.g., about 0.35 to 2.3 parts by weight), usually about 0.1 to 3 parts by weight (e.g., about 0.3 to 2.5 parts by weight), and preferably about 0.4 to 2.3 parts by weight (e.g., about 0.5 to 2 parts by weight).

The ratio of the cellulose fiber (A) relative to the carboxymethyl-group-containing cellulose ether (salt) (B) may be selected from a wide range of 100/0 to 1/99, for example, 99/1 to 1/99 (e.g., 99/1 to 10/90) in the former/the latter (weight ratio) in terms of solid content; for example, the ratio may be about 95/5 to 5/95 (e.g., about 95/5 to 20/80), preferably about 90/10 to 10/90 (e.g., about 90/10 to 25/75), more preferably about 85/15 to 20/80 (e.g., about 85/15 to 30/70), particularly about 80/20 to 30/70 (e.g., about 80/20 to 33/67), and usually about 75/25 to 35/65. In a case where the ratio of the carboxymethyl-group-containing cellulose ether (salt) relative to the cellulose fiber is too low, the electrode active material may fail to be uniform and thus the surface smoothness (coating uniformity) may fail to be improved. In a case where the ratio of the carboxymethyl-group-containing cellulose ether (salt) relative to the cellulose fiber is too high, the slurry may have a high viscosity, thus failing to improve in coating property or making the binding strength insufficient.

The amount of the carboxymethyl-group-containing cellulose ether (salt) (B) based on 100 parts by weight of the electrode active material (C) may be selected from a wide range of 0.01 to 10 parts by weight in terms of solid content; and in the light of further improving the surface smoothness (coating uniformity), the amount may be, for example, about 0.05 to 5.5 parts by weight, preferably about 0.1 to 3.5 parts by weight (e.g., about 0.15 to 3 parts by weight), more preferably about 0.2 to 2.5 parts by weight (e.g., about 0.25 to 2 parts by weight), particularly about 0.3 to 1.95 parts by weight (e.g., about 0.35 to 1.9 parts by weight), and usually about 0.4 to 1.85 parts by weight (e.g., about 0.4 to 1.8 parts by weight). Moreover, the amount of the carboxymethyl-group-containing cellulose ether (salt) (B) based on 100 parts by weight of the electrode active material (C) may be selected from a wide range of 0.01 to 10 parts by weight, for example, 0.02 to 10 parts by weight (e.g., 0.05 to 5 parts by weight) in terms of solid content; and the amount may be, for example, about 0.1 to 4 parts by weight (e.g., about 0.25 to 3.5 parts by weight), preferably about 0.3 to 3 parts by weight (e.g., about 0.5 to 2.5 parts by weight), and more preferably about 0.7 to 2 parts by weight (e.g., about 0.75 to 2 parts by weight) or may usually be about 0.5 to 2.5 parts by weight (e.g., about 1 to 2 parts by weight).

Moreover, in order not to inhibit a function of the cellulose fiber as a binder and in order to improve the adhesion of the electrode active material to the current collector, a small amount of the carboxymethyl-group-containing cellulose ether (salt) (B) is preferred based on 100 parts by weight of the electrode active material (C) in terms of solid content; for example, the amount may be about 0.05 to 2.5 parts by weight, preferably about 0.1 to 2 parts by weight (e.g., about 0.15 to 1.5 parts by weight), more preferably about 0.2 to 1.2 parts by weight (e.g., about 0.25 to 1 parts by weight), particularly about 0.3 to 0.7 parts by weight (e.g., about 0.3 to 0.65 parts by weight), and usually about 0.35 to 0.6 parts by weight (e.g., about 0.35 to 0.55 parts by weight). Further, in order to improve the dispersibility of the electrode active material and improve the surface smoothness of the electrode after coating, a large amount of the carboxymethyl-group-containing cellulose ether (salt) (B) is preferred based on 100 parts by weight of the electrode active material (C) in terms of solid content; for example, the amount may be about 0.2 to 5 parts by weight, preferably about 0.5 to 3.5 parts by weight (e.g., about 0.6 to 3.5 parts by weight), more preferably about 1 to 3 parts by weight (e.g., about 1.4 to 2 parts by weight), particularly about 1.5 to 1.95 parts by weight (e.g., about 1.55 to 1.9 parts by weight), and usually about 1.6 to 1.85 parts by weight.

The amount of the carboxymethyl-group-containing cellulose ether (salt) (B) based on 100 parts by weight of the total amount of the cellulose fiber (A), the carboxymethyl-group-containing cellulose ether (salt) (B), and the electrode active material (C) may be selected from a wide range of 0.01 to 10 parts by weight in terms of solid content; and in the light of further improving the surface smoothness (coating uniformity), the amount may be, for example, about 0.05 to 5 parts by weight, preferably about 0.1 to 3 parts by weight (e.g., about 0.15 to 2.5 parts by weight), more preferably about 0.2 to 2 parts by weight (e.g., about 0.25 to 1.95 parts by weight), particularly about 0.3 to 1.9 parts by weight (e.g., about 0.35 to 1.85 parts by weight), and usually about 0.4 to 1.8 parts by weight. Moreover, the amount of the carboxymethyl-group-containing cellulose ether (salt) (B) based on 100 parts by weight of the total amount of the cellulose fiber (A), the carboxymethyl-group-containing cellulose ether (salt) (B), and the electrode active material (C) may be selected from a wide range of about 0.02 to 10 parts by weight (e.g., about 0.05 to 4.5 parts by weight) in terms of solid content; and the amount may be, for example, about 0.1 to 4 parts by weight (e.g., about 0.1 to 3 parts by weight), preferably about 0.3 to 2.5 parts by weight (e.g., about 0.5 to 2 parts by weight), more preferably about 0.6 to 1.8 parts by weight (e.g., about 0.75 to 1.75 parts by weight), and usually about 0.5 to 2 parts by weight (e.g., about 1 to 2 parts by weight).

Moreover, in order not to inhibit the function of the cellulose fiber as the binder by the carboxymethyl-group-containing cellulose (salt) and in order to improve the adhesion of the electrode active material to the current collector, a small amount of the carboxymethyl-group-containing cellulose ether (salt) (B) is preferred based on 100 parts by weight of the total amount of the cellulose fiber (A), the carboxymethyl-group-containing cellulose ether (salt) (B), and the electrode active material (C) in terms of solid content; for example, the amount may be about 0.05 to 2.5 parts by weight, preferably about 0.1 to 2 parts by weight (e.g., about 0.15 to 1.5 parts by weight), more preferably about 0.2 to 1 parts by weight (e.g., about 0.25 to 0.7 parts by weight), particularly about 0.3 to 0.65 parts by weight, and usually about 0.35 to 0.6 parts by weight. Further, in order to improve the dispersibility of the electrode active material and improve the surface smoothness of the electrode after coating, a large amount of the carboxymethyl-group-containing cellulose ether (salt) (B) is preferred based on 100 parts by weight of the total amount of the cellulose fiber (A), the carboxymethyl-group-containing cellulose ether (salt) (B), and the electrode active material (C) in terms of solid content; for example, the amount may be about 0.2 to 5 parts by weight, preferably about 0.5 to 3 parts by weight (e.g., about 0.6 to 3 parts by weight), more preferably about 1 to 2 parts by weight (e.g., about 1.4 to 1.95 parts by weight), particularly about 1.5 to 1.9 parts by weight (e.g., about 1.55 to 1.85 parts by weight), and usually about 1.6 to 1.8 parts by weight.

The total content of the cellulose fiber (A) and the carboxymethyl-group-containing cellulose ether (salt) (B) based on the 100 parts by weight of the electrode active material (C) may be selected from a wide range of 0.1 to 10 parts by weight (e.g., 0.5 to 7.5 parts by weight) in terms of solid content; and in the light of further improving the coating property, the total content may be, for example, about not more than 7 parts by weight (e.g., about 0.5 to 6.5 parts by weight), preferably about not more than 5 parts by weight (e.g., about 0.8 to 4.5 parts by weight), more preferably about not more than 4.5 parts by weight (e.g., about 1 to 4.5 parts by weight), particularly about not more than 4 parts by weight (e.g., about 1.3 to 4 parts by weight), usually about not more than 3.9 parts by weight (e.g., about 1.35 to 3.9 parts by weight, preferably about 1.4 to 3.9 parts by weight, and more preferably about 1.5 to 3.5 parts by weight). Moreover, the total content of the cellulose fiber (A) and the carboxymethyl-group-containing cellulose ether (salt) (B) based on the 100 parts by weight of the electrode active material (C) may be selected from a range of about 0.1 to 10 parts by weight (e.g., about 0.5 to 8 parts by weight) in terms of solid content; and the total content may be, for example, about 0.5 to 7 parts by weight (e.g., about 0.8 to 6 parts by weight), preferably about 1 to 5 parts by weight (e.g., about 1 to 4.5 parts by weight), more preferably about 1.5 to 4 parts by weight (e.g., about 1.75 to 3.75 parts by weight), and usually about 1 to 5 parts by weight (e.g., about 1 to 4 parts by weight).

The total content of the cellulose fiber (A) and the carboxymethyl-group-containing cellulose ether (salt) (B) based on 100 parts by weight of the total amount of the cellulose fiber (A), the carboxymethyl-group-containing cellulose ether (salt) (B), and the electrode active material (C) may be selected from a wide range of 0.1 to 10 parts by weight (e.g., 0.5 to 7.5 parts by weight) in terms of solid content; and in the light of further improving the coating property, the total content may be, for example, about not more than 6.5 parts by weight (e.g., about 0.5 to 6 parts by weight), preferably about not more than 5 parts by weight (e.g., about 0.8 to 5 parts by weight), more preferably about not more than 4.5 parts by weight (e.g., about 1 to 4 parts by weight), particularly about not more than 4 parts by weight (e.g., about 1.3 to 3 parts by weight), usually about not more than 3.7 parts by weight (e.g., about 1.35 to 3.7 parts by weight, preferably about 1.4 to 3.7 parts by weight, and more preferably about 1.5 to 3.5 parts by weight). Moreover, the total content of the cellulose fiber (A) and the carboxymethyl-group-containing cellulose ether (salt) (B) based on 100 parts by weight of the total amount of the cellulose fiber (A), the carboxymethyl-group-containing cellulose ether (salt) (B), and the electrode active material (C) may be selected from a range of about 0.1 to 10 parts by weight (e.g., about 0.5 to 7.5 parts by weight) in terms of solid content; and the total content may be, for example, about 0.5 to 6 parts by weight (e.g., about 0.7 to 5 parts by weight), preferably about 0.8 to 4.5 parts by weight (e.g., about 1 to 4.2 parts by weight), more preferably about 1 to 4 parts by weight (e.g., about 1.5 to 3.5 parts by weight), and usually about 1 to 5 parts by weight (e.g., about 1 to 4.5 parts by weight).

The amount of the electrode active material (C) based on 100 parts by weight of the total amount of the cellulose fiber (A), the carboxymethyl-group-containing cellulose ether (salt) (B), and the electrode active material (C) may be selected from a wide range of 75 to 99.9 parts by weight (e.g., 80 to 99.9 parts by weight); and in the light of obtaining sufficient charge-discharge characteristics, the amount may be, for example, about 85 to 99.7 parts by weight, preferably about 90 to 99.5 parts by weight, more preferably about 93 to 99.3 parts by weight, and particularly about 95 to 99 parts by weight (e.g., about 97 to 99 parts by weight). Moreover, the amount of the electrode active material (C) based on 100 parts by weight of the total amount of the electrode active material (C), the carboxymethyl-group-containing cellulose ether (salt) (B), and the cellulose fiber (A) may be selected from a range of about 80 to 99.9 parts by weight (e.g., about 85 to 99 parts by weight); and the amount may be, for example, about 87 to 98 parts by weight, preferably about 88 to 97 parts by weight, and more preferably about 90 to 95 parts by weight or may be about 93 to 99 parts by weight (e.g., about 95 to 99 parts by weight).

The amount of the conductive auxiliary (D) may be about 0.1 to 30 parts by weight (e.g., about 0.5 to 20 parts by weight) and preferably about 1 to 10 parts by weight (e.g., about 2 to 8 parts by weight) based on 100 parts by weight of the electrode active material.

The amount of the rubber component (parts by weight) based on 100 parts by weight of the cellulose fiber (A) may be about 1 to 1000 parts by weight, preferably about 5 to 500 parts by weight, and more preferably about 10 to 300 parts by weight in terms of solid content.

The content of the additive(s) based on the whole solid content of the slurry may be about not more than 1% by weight (particularly about not more than 0.5% by weight).

The electrode slurry of the present invention may further contain a solvent such as water (an aqueous solvent containing at least water). In the present invention, since the cellulose fiber (A) and the carboxymethyl-group-containing cellulose ether (salt) (B) have a high dispersibility or solubility in water, the electrode active material is dispersible in a slurry form without an organic solvent. In a case where the electrode slurry of the present invention contains a solvent, the total content of the cellulose fiber (A), the carboxymethyl-group-containing cellulose ether (salt) (B), and the electrode active material (C) based on the whole slurry may be not more than 60% by weight (for example, 10 to 50% by weight) in terms of solid content; for example, the total content may be, for example, about 15 to 60% by weight, preferably about 20 to 55% by weight, and more preferably about 25 to 50% by weight. In a case where the solid content is too low, it may be difficult to form a thick electrode; and an excessively high solid content may reduce the coating property. The electrode slurry of the present invention may contain an organic solvent such as an aqueous organic solvent (e.g., a $C_{1-4}$alkanol such as ethanol or isopropyl alcohol). It is preferred that the electrode slurry substantially contain no organic solvent. The amount of the organic solvent based on 100 parts by weight of water may be, for example, about not more than 100 parts by weight (e.g., about 0.1 to 100 parts by weight), preferably about not more than 80 parts by weight (e.g., about 0.5 to 80 parts by weight), and more preferably about not more than 50 parts by weight (e.g., about 1 to 50 parts by weight).

The electrode slurry may have a viscosity (25° C., Brookfield viscometer, Rotor No. 4, 30 rpm) of, for example, about 200 to 100000 mPa·s, preferably about 300 to 30000 mPa·s, and more preferably about 500 to 10000 mPa·s. The electrode slurry having too low a viscosity may make it difficult to form a thick electrode. The electrode slurry having too high a viscosity may have a reduced coating property.

The electrode slurry of the present invention can be produced by mixing the cellulose fiber (A), the carboxymethyl-group-containing cellulose ether (salt) (B), and the electrode active material (C) in an aqueous medium (for example, water). The order of mixing is not particularly limited to a specific one. Each component may be added to water at once. For example, to the aqueous medium (for example, water) may be added the cellulose fiber (A) and the carboxymethyl-group-containing cellulose ether (salt) (B) and then added and mixed the electrode active material (C).

As described above, in a case where the carboxymethyl-group-containing cellulose ether (salt) (B) and the cellulose fiber (A) are used in combination, the carboxymethyl-group-containing cellulose ether (salt) (B) is probably localized near the cellulose fiber (A) due to a high affinity between them, and thus mixing the above components in a coexistent system of the carboxymethyl-group-containing cellulose ether (salt) (B) and the cellulose fiber (A) reduces the function of protecting the surface of the electrode by the carboxymethyl-group-containing cellulose ether (salt) (B) and decreases the electrode capacity with charging and discharging.

Meanwhile, when at least the electrode active material (C) and the carboxymethyl-group-containing cellulose ether (salt) (B) are mixed in a manner or form where these components (B) and (A) are separated each other, the electrode active material (C) is probably coated or covered with the carboxymethyl-group-containing cellulose ether (salt) (B) to effectively protect the surface of the electrode. Probably due to this protection, a high electrode capacity is retained or maintained even after repeated charging and discharging.

Thus, according to a preferred process, at least the electrode active material (C) is treated (or premixed or coated) with the carboxymethyl-group-containing cellulose ether (salt) (B), and then the cellulose fiber (A) is mixed therewith to prepare the slurry composition. In this process, the carboxymethyl-group-containing cellulose ether (salt) (B) is practically used in the form of an aqueous solution. The concentration (solid concentration) of the aqueous solution of the carboxymethyl-group-containing cellulose ether (salt) (B) is not particularly limited to a specific one, and, for example, the solid concentration may be about 0.1 to 10% by weight, preferably about 0.5 to 5% by weight (e.g., about 1 to 5% by weight), and more preferably about 1 to 3% by weight.

The treatment of the electrode active material (C) may be, if necessary, spraying of the electrode active material (C) with the aqueous solution of the carboxymethyl-group-containing cellulose ether (salt) (B), immersion of the electrode active material (C) in the aqueous solution of the carboxymethyl-group-containing cellulose ether (salt) (B), spray drying of a mixture of the electrode active material (C) and the aqueous solution of the carboxymethyl-group-containing cellulose ether (salt) (B), or other methods. In practical cases, the electrode active material (C) and the carboxymethyl-group-containing cellulose ether (salt) (B) are usually mixed in an aqueous medium for treatment. In particular, the electrode active material (C) and the aqueous solution of the carboxymethyl-group-containing cellulose ether (salt) (B) are mixed to prepare an aqueous mixture in practical cases.

Such a treatment produces an aqueous mixture (an aqueous mixture or aqueous dispersion containing at least the electrode active material (C) and the carboxymethyl-group-containing cellulose ether (salt) (B)).

Incidentally, in the preparation of the aqueous mixture containing the electrode active material (C), the electrode active material (C) and the carboxymethyl-group-containing cellulose ether (salt) (B) may be mixed in the coexistence of the cellulose fiber (A) to prepare an aqueous mixture, in any range that does not impair battery characteristics. For example, at least the electrode active material (C) and the carboxymethyl-group-containing cellulose ether (salt) (B) may be mixed in the absence or coexistence of the cellulose fiber (A) in an amount of, if necessary, about 0 to 50% by weight, preferably about 1 to 30% by weight, more preferably about 2 to 15% by weight (e.g., about 3 to 10% by weight) based on the total amount of the cellulose fiber (A) in terms of solid content.

In the preparation of the aqueous mixture, at least the electrode active material (C) is necessarily pretreated. The conductive auxiliary (D) may be added and mixed in an appropriate stage (for example, after the electrode active material (C) is treated with the carboxymethyl-group-containing cellulose ether (salt) (B) or after the cellulose fiber (A) is admixed). In order to form an excellent conductive path to the electrode active material (C), it is preferred that the conductive auxiliary (D) together with the electrode active material (C) be pretreated with the carboxymethyl-group-containing cellulose ether (salt) (B).

Moreover, the cellulose fiber (A) may be used in the form of an aqueous dispersion liquid (or aqueous dispersion). The solid concentration of the cellulose fiber (A) in the aqueous dispersion is not particularly limited to a specific one, and for example, the cellulose fiber (A) may be used in a solid concentration of about 0.1 to 20% by weight, preferably about 1 to 17% by weight (e.g., about 3 to 15% by weight), and more preferably about 5 to 12% by weight (e.g., about 7 to 12% by weight). The aqueous mixture (the aqueous mixture containing the electrode active material (C)) and the aqueous dispersion liquid (or aqueous dispersion) of the cellulose fiber (A) can be mixed in various manners, and the aqueous mixture may be mixed with the aqueous dispersion together simply. In usual cases, the whole amount of the aqueous dispersion of the cellulose fiber (A) is added and mixed continuously or stepwise (or in plural portions) to the aqueous mixture (the aqueous mixture containing the electrode active material (C)) to prepare the slurry composition.

Further, in the preparation step of the slurry composition, the cellulose fiber (A) may be mixed in the coexistence of the carboxymethyl-group-containing cellulose ether (salt) (B) in an amount that does not impair the electrode characteristics (for example, if necessary, about 0 to 50% by weight, preferably about 1 to 30% by weight, and more preferably about 2 to 15% by weight (e.g., about 3 to 10% by weight) based on the whole amount of the carboxymethyl-group-containing cellulose ether (salt) (B) in terms of solid content), preparing the slurry composition.

The rubber component and/or the additive may be added in an appropriate stage.

The mixing method is not particularly limited to a specific one. There may be used a conventional stirring or mixing means (for example, a hand stirring using a stirring rod or others), a mechanical stirring means (for example, a conventional mixer such as a homomixer, a homodisper, a Henschel mixer, a banbury mixer, a ribbon mixer, a V-shaped mixer, or a planetary centrifugal mixer), and an ultrasonic disperser).

[Non-Aqueous Secondary Battery Electrode]

The non-aqueous secondary battery electrode of the present invention comprises a current collector and an electrode active material layer formed on at least one surface of the current collector, and the electrode active material layer contains the cellulose fiber (A), the carboxymethyl-group-containing cellulose ether (salt) (B), and the electrode active material (C). The electrode active material layer may further contain the conductive auxiliary (D). The non-aqueous secondary battery electrode can be produced by applying the electrode slurry on the current collector and drying the applied slurry (or coating layer) to form an electrode active material layer. The electrode slurry may be applied on one surface of the current collector or may be applied on both surfaces of the current collector. As the current collector, there may be used a metal foil made of an electroconductor such as copper, aluminum, gold, silver, or stainless steel.

The amount of the electrode slurry to be applied may be, for example, about 20 to 350 g/m$^2$, preferably about 30 to 300 g/m$^2$, more preferably about 40 to 250 g/m$^2$ (e.g., about 50 to 250 g/m$^2$) in terms of solid content.

The average thickness (dry thickness) of the applied layer (the electrode active material layer) may be selected from a wide range of 2 to 500 μm; for example, the average thickness may be about not less than 5 μm (e.g., about 5 to 450 μm), preferably about not less than 10 m (e.g., about 10 to 400 μm), more preferably about not less than 20 μm (e.g., about 20 to 300 μm), and particularly about not less than 30 μm (e.g., about 30 to 250 μm) or may be about 50 to 200 μm. In a case where the thickness is too small, the cellulose fiber may fluff on the surface of the electrode, forming a gap between the electrode and a separator and thus reducing a capacity density of a battery. Incidentally, in the present invention, the thickness of the electrode active material layer may be determined from the thickness of any position (n=about 20) measured based on an electron micrograph.

The method of applying the electrode slurry is not particularly limited to a specific one and may include a conventional method (for example, roll coating, air knife coating, blade coating, rod coating, reverse coating, bar coating, comma coating, dip and squeeze coating, die coating, gravure coating, microgravure coating, and silkscreen coating). The drying method is not particularly limited to a specific one, and may include air drying or may use hot air, far infrared radiation, microwave, or other means.

Further, in order to increase the adhesion of the electrode active material layer to the current collector, the electrode active material layer may be crimped or pressed to the current collector.

The electrode of the present invention is utilizable as an electrode (a positive electrode or negative electrode) of various non-aqueous secondary batteries. It is preferred to use the electrode as a positive electrode or negative electrode (particularly a negative electrode) of a lithium-ion battery. The lithium-ion battery can comprise, for example, a negative electrode obtained from the slurry of the present invention, a conventional positive electrode, a separator, and an electrolytic solution. The positive electrode may comprise a current collector comprising a metal foil such as aluminum, copper, gold, silver, or stainless steel, and a positive electrode active material comprising the lithium composite oxide. The separator may comprise a polyolefin-series porous film such as a polypropylene microporous film, a polyethylene microporous film, or a microporous film that is a laminate of a porous polypropylene and a porous polyethylene, a polyetherimide microporous film, a polyamideimide microporous film, or other films. Moreover, these films may have one or both surface(s) coated with an inorganic fine particle of a ceramic including alumina or magnesia or an organic matter such as aramid or PVdF, mainly in order to improve the heat resistance. The electrolytic solution may be a non-aqueous electrolytic solution having an electrolyte [e.g., a lithium salt such as $LiPF_6$, $LiClO_4$, $LiBF_4$, $LiAsF_6$, $LiCl$, $LiI$, $Li(CF_3SO_2)_2N$, or $Li(C_2F_5SO_2)_2N$] dissolved in an organic solvent (such as propylene carbonate, butylene carbonate, ethylene carbonate, diethyl carbonate, dimethyl carbonate, or ethyl methyl carbonate). The battery may be a polymer (gel polymer) lithium-ion battery having a gel electrolyte (for example, a gelled electrolyte containing a polymer such as a polyethylene oxide or a polyvinylidene difluoride in an electrolytic solution) instead of the electrolytic solution.

EXAMPLES

The following examples are intended to describe this invention in further detail and should by no means be interpreted as defining the scope of the invention. In the following examples, "part" or "%" is by mass unless otherwise stated. The details of materials are as follows. A surface smoothness (coating uniformity) and a coating property (coatability) were evaluated on the basis of the following criteria.

[Materials]

Graphite: an artificial graphite (an average particle size of 20 μm)

Silicon particle: ("Silicon nanopowder" manufactured by Sigma-Aldrich Co. LLC, a maximum particle size of 100 nm)

Silicon oxide particle: a SiO particle having an average particle size of 2.8 μm Acetylene black ("DENKA BLACK" manufactured by Denka Company Limited, an average particle size of 35 nm)

CMC: a carboxymethyl cellulose sodium salt ("Carboxymethyl cellulose sodium salt" manufactured by Daicel FineChem Ltd.; simply stated as carboxymethyl cellulose or CMC)

SBR: a styrene-butadiene rubber (TRD-2001 manufactured by JSR Corporation, a solid content of 48.5% by weight)

CNF1, CF1, CF2, CF3: these cellulose fibers were produced by the following methods.

Preparation Example 1

"LBKP pulp" manufactured by Hyogo Pulp Co., Ltd. was used to prepare 100 liters of a 1% by weight aqueous slurry. Then, the slurry was beat 10 times using a disc refiner ("SUPERFIBRATER 400-TFS" manufactured by HASEGAWA REFRIGERATION, LTD.) at a clearance of 0.15 mm and a disc rotational speed of 1750 rpm to give a refined product. The refined product was processed 50 times at a processing pressure of 50 MPa using a homogenizer ("15M8AT" manufactured by Gaulin) equipped with a crushing-type homovalve sheet. The resulting microfibrillared fiber was observed using a transmission electron microscope (TEM), 10 fibers were chosen at random, and the fiber length and the fiber diameter were measured for the chosen fibers. The 10 fibers had an average fiber diameter of 79.2 nm, an average fiber length of 6.14 μm, and an aspect ratio (average fiber length/average fiber diameter) of 78. The resulting 1% by weight aqueous slurry was filtered through gauze repeatedly to give a slurry having a solid concentration of 9.9% by weight. The cellulose fiber in this slurry was referred to as CNF1.

Preparation Example 2

"LBKP pulp" manufactured by Hyogo Pulp Co., Ltd. was used to prepare 100 liters of a 1% by weight aqueous slurry. The resulting cellulose fiber was measured by a fiber length measuring apparatus ("KAJAANI FS300" manufactured by Metso Automation). The average fiber length was 0.89 mm. The resulting cellulose fiber was referred to as CF1.

Preparation Example 3

"LBKP pulp" manufactured by Hyogo Pulp Co., Ltd. was used to prepare 100 liters of a 1% by weight aqueous slurry. Then, the slurry was beat 10 times using a disc refiner ("SUPERFIBRATER 400-TFS" manufactured by HASEGAWA REFRIGERATION, LTD.) at a clearance of 0.15 mm and a disc rotational speed of 1750 rpm to give a refined product. The refined product was processed 10 times at a processing pressure of 50 MPa using a homogenizer ("15M8AT" manufactured by Gaulin) equipped with a crushing-type homovalve sheet. The resulting microfibrillared fiber was measured by the above-mentioned fiber length measuring apparatus. The average fiber length was 0.78 mm. The resulting 1% by weight aqueous slurry was used as it was without being subjected to drainage concentration or other steps. The resulting cellulose fiber was referred to as CF2.

Preparation Example 4

"LBKP pulp" manufactured by Hyogo Pulp Co., Ltd. was used to prepare 100 liters of a 1% by weight aqueous slurry. Then, the slurry was beat 10 times using a disc refiner ("SUPERFIBRATER 400-TFS" manufactured by HASEGAWA REFRIGERATION, LTD.) at a clearance of 0.15 mm and a disc rotational speed of 1750 rpm to give a refined product. The refined product was processed 30 times at a processing pressure of 50 MPa using a homogenizer ("15M8AT" manufactured by Gaulin) equipped with a crushing-type homovalve sheet. The resulting microfibrillared fiber was measured by the above-mentioned fiber length measuring apparatus. The average fiber length was 0.54 mm. The resulting 1% by weight aqueous slurry was used as it was without being subjected to drainage concentration or other steps. The resulting cellulose fiber was referred to as CF3.

Example 1

In a polypropylene container, 86.5 g of water was charged. To the container was added 8.5 g of the 9.9% by weight CNF1-containing slurry obtained in Preparation Example 1, and the mixture was stirred for dispersion by a stirrer until the mixture become transparent by visual observation. To the resulting dispersion was added 22.5 g of a 1.5% by weight aqueous solution of CMC, and then was added 83 g of artificial graphite (average particle size: about 20 μm) as an active material. The resulting mixture was stirred at 3000 rpm for 30 minutes using a homodisper ("Model L" manufactured by Tokushu Kika Kogyo Co., Ltd.) and the paste was degassed. The resulting paste was referred to as Paste 1. The weight ratio of artificial graphite, CMC, and CNF1 was 98.6:0.4:1 (in terms of solid content; the same applies hereinafter). The resulting Paste 1 was applied on a copper foil having a thickness of 10 μm using an applicator in a coated amount after drying of 100 to 130 g/m$^2$, and the coated layer was dried to produce an electrode. The electrode active material layer had an average thickness of 150 μm.

Example 2

An electrode was produced in the same manner as Example 1 except that 53.6 g of water, 8.55 g of the 9.9% by weight CNF1-containing slurry obtained in Preparation Example 1, 56.5 g of a 1.5% by weight aqueous solution of CMC, and 83 g of artificial graphite (average particle size: 20 μm) were used and that the weight ratio of artificial graphite, CMC, and CNF1 was 98:1:1. The electrode active material layer had an average thickness of 150 μm.

Example 3

An electrode was produced in the same manner as Example 1 except that 42.6 g of water, 8.57 g of the 9.9% by weight CNF1-containing slurry obtained in Preparation Example 1, 67.9 g of a 1.5% by weight aqueous solution of CMC, and 83 g of artificial graphite (average particle size: 20 μm) were used and that the weight ratio of artificial graphite, CMC, and CNF1 was 97.8:1.2:1. The electrode active material layer had an average thickness of 150 μm.

Example 4

An electrode was produced in the same manner as Example 1 except that 37.1 g of water, 8.58 g of the 9.9% by weight CNF1-containing slurry obtained in Preparation Example 1, 73.6 g of a 1.5% by weight aqueous solution of CMC, and 83 g of artificial graphite (average particle size: 20 μm) were used and that the weight ratio of artificial graphite, CMC, and CNF1 was 97.7:1.3:1. The electrode active material layer had an average thickness of 150 μm.

Example 5

An electrode was produced in the same manner as Example 1 except that 31.5 g of water, 8.59 g of the 9.9% by weight CNF1-containing slurry obtained in Preparation Example 1, 79.4 g of a 1.5% by weight aqueous solution of CMC, and 83 g of artificial graphite (average particle size: about 20 μm) were used and that the weight ratio of artificial graphite, CMC, and CNF1 was 97.6:1.4:1. The electrode active material layer had an average thickness of 150 μm.

Example 6

An electrode was produced in the same manner as Example 1 except that 9.2 g of water, 8.63 g of the 9.9% by weight CNF1-containing slurry obtained in Preparation Example 1, 102.5 g of a 1.5% by weight aqueous solution of CMC, and 83 g of artificial graphite (average particle size: about 20 μm) were used and that the weight ratio of artificial graphite, CMC, and CNF1 was 97.2:1.8:1. The electrode active material layer had an average thickness of 150 μm.

Example 7

An electrode was produced in the same manner as Example 1 except that 19.1 g of water, 47.6 g of the 9.9% by weight CF3-containing slurry obtained in Preparation Example 4, 60.9 g of a 1.5% by weight aqueous solution of CMC, and 90 g of artificial graphite (average particle size: about 20 μm) were used and that the weight ratio of artificial graphite, CMC, and CF3 was 98.5:1:0.5. The electrode active material layer had an average thickness of 150 μm.

Example 8

In a polypropylene container, 20.0 g of water was charged. To the container was added 10.1 g of the 9.9% by weight CNF1-containing slurry obtained in Preparation Example 1, and the mixture was stirred for dispersion by a stirrer until the mixture become transparent by visual observation. Then, 30 g of water was added thereto. To the resulting dispersion were added 1.0 g of CMC powder and 97.5 g of artificial graphite (average particle size: about 20 μm) as an active material, and the resulting mixture was stirred at 15 rpm for 3 minutes using a planetary mixer. Thereafter, to the mixture was added 138 g of water divided in five portions, in a manner that the mixture was stirred at 50 rpm for 10 minutes using a planetary mixer after each addition of water portion. Finally, 1.035 g of SBR was added thereto, and the resulting mixture was stirred at 50 rpm for 10 minutes using a planetary mixer. The weight ratio of artificial graphite, CMC, CNF1, and SBR in the resulting paste was 97.5:1:1:0.5. The resulting paste was applied on a copper foil having a thickness of 10 μm using an applicator in a coated amount after drying of 100 to 110 g/m², and the coated layer was dried and was pressed by roll pressing to produce an electrode. The electrode active material layer had an average thickness of 67 μm.

Example 9

In a polypropylene container, 2.0 g of a 1% by weight aqueous solution of CMC and 0.74 g of silicon particle having an average particle size of 50 nm as an active material were charged. A stirring treatment (treating time: 2 minutes) at 2000 rpm using a planetary mixer was performed 5 times. To the resulting mixture were added 0.4 g of acetylene black and 1.5 g of a 1% by weight aqueous solution of CMC, and a stirring treatment (treating time: 2 minutes) at 2000 rpm using a planetary mixer was performed 5 times. To the resulting mixture were added 8.5 g of artificial graphite (average particle size: about 20 μm) as an active material, 2.0 g of a 1% by weight aqueous solution of CMC, and 2.0 g of the 9.9% by weight CNF1-containing slurry obtained in Preparation Example 1, and a stirring treatment (treating time: 2 minutes) at 2000 rpm using a planetary mixer was performed 3 times. To the resulting mixture were added 9.5 g of a 1% by weight aqueous solution of CMC, 13 g of water, and then 0.11 g of SBR, in a manner that the mixture was stirred at 2000 rpm for 2 minutes using a planetary mixer after each addition. The weight ratio of the active material (artificial graphite/silicon (weight ratio)=92/8), acetylene black, CMC, CNF1, and SBR in the resulting paste was 92:4:1.5:2:0.5. The resulting paste was applied on a copper foil having a thickness of 10 μm using an applicator in a coated amount after drying of 50 to 60 g/m², and the coated layer was dried and was pressed by roll pressing to produce an electrode. The electrode active material layer had an average thickness of 38 μm.

Example 10

In a polypropylene container, 1.3 g of a 1% by weight aqueous solution of CMC and 0.60 g of silicon particle having an average particle size of 50 nm as an active material were charged. A stirring treatment (treating time: 2 minutes) at 2000 rpm using a planetary mixer was performed 5 times. Thereto were added 0.4 g of acetylene black and 1.6 g of a 1% by weight aqueous solution of CMC, and a stirring treatment (treating time: 2 minutes) at 2000 rpm using a planetary mixer was performed 5 times. Thereto were added 5.4 g of artificial graphite (average particle size: about 20 μm) as an active material, 1.3 g of a 1% by weight aqueous solution of CMC, and 1.35 g of the 9.9% by weight CNF1-containing slurry obtained in Preparation Example 1, and a stirring treatment (treating time: 2 minutes) at 2000 rpm using a planetary mixer was performed 3 times. Thereto were added 5 g of a 1% by weight aqueous solution of CMC, 7 g of water, and then 0.07 g of SBR, in a manner that the mixture was stirred at 2000 rpm for 2 minutes using a planetary mixer after each addition. The weight ratio of the active material (artificial graphite/silicon (weight ratio)=90/10), acetylene black, CMC, CNF1, and SBR in the resulting paste was 90:6:1.5:2:0.5. The resulting paste was applied on a copper foil having a thickness of 10 μm using an applicator in a coated amount after drying of 50 to 60 g/m², and the coated layer was dried and was pressed by roll pressing to produce an electrode. The electrode active material layer had an average thickness of 38 μm.

Example 11

In a polypropylene container, 5.0 g of a 1% by weight aqueous solution of CMC, 1.38 g of a SiO particle having an average particle size of 2.8 μm as an active material, 7.82 g of artificial graphite (average particle size: 20 μm) as an active material, 0.4 g of acetylene black, and 2.03 g of the 9.9% by weight CNF1-containing slurry obtained in Preparation Example 1 were charged. The mixture was stirred at 2000 rpm for 2 minutes using a planetary mixer. To the resulting mixture were added 2.5 g of a 1% by weight aqueous solution of CMC, 7.5 g of a 1% by weight aqueous solution of CMC, 9 g of water, and then 0.10 g of SBR, in a manner that the mixture was stirred at 2000 rpm for 2 minutes using a planetary mixer after each addition. The weight ratio of the active material (artificial graphite/SiO (weight ratio)=85/15) acetylene black, CMC, CNF1, and SBR in the resulting paste was 92:4:1.5:2:0.5. The resulting paste was applied on a copper foil having a thickness of 10 μm using an applicator in a coated amount after drying of 50 to 60 g/m², and the coated layer was dried and was pressed by roll pressing to produce an electrode. The electrode active material layer had an average thickness of 36 μm.

Comparative Example 1

An electrode was produced in the same manner as Example 1 except that 3.5 g of water, 48.6 g of the 1% by weight CF1-containing slurry obtained in Preparation Example 2, 60.9 g of a 1.5% by weight aqueous solution of CMC, 90 g of artificial graphite (average particle size: about 20 μm) were used and that the weight ratio of artificial graphite, CMC, and CF1 was 98.5:1:0.5.

Comparative Example 2

An electrode was produced in the same manner as Example 1 except that 16.5 g of water, 47.6 g of a 1% by weight CF2-containing slurry obtained in Preparation Example 3, 60.9 g of a 1.5% by weight aqueous solution of CMC, 90 g of artificial graphite (average particle size: about 20 μm) were used and that the weight ratio of artificial graphite, CMC, and CF2 was 98.5:1:0.5.

The electrodes obtained in Examples and Comparative Examples were evaluated for the electrode uniformity and the coating property of the slurry on the basis of the following criteria.

[Surface Smoothness (Coating Uniformity): Coating Layer State]

The state of the coated layer of the resulting electrode was visually observed and evaluated on the basis of the following criteria.

A: The coated layer has no uneven structure (recesses and/or protrusions) and has a smooth surface.

B: The coated layer has an extremely slightly uneven structure (extremely slight recesses and/or protrusions) but there is no practical problem in use.

C: The coated layer has a significantly uneven structure (large recesses and/or protrusions).

D: The paste has no flowability and fails to be applied.

The coating property (coatability) of the resulting paste was evaluated on the basis of the following criteria.

A: There is no problem of coating property (coatability).

B: The paste has too high a viscosity and is thus low in coating property (coatability).

C: The paste has no flowability and fails to be applied.

The evaluation results of Examples and Comparative Examples are shown in Table 1.

TABLE 1

| | Cellulose fiber Fiber length (mm) | Cellulose fiber (% by weight) | CMC (% by weight) | Electrode active material Artificial graphite (% by weight) | Silicon (% by weight) | Conductive auxiliary Acetylene black (% by weight) | Rubber component SBR (% by weight) | Coated layer state | Coating property |
|---|---|---|---|---|---|---|---|---|---|
| Ex. 1 | CNF1 0.006 | 1 | 0.4 | 98.6 | — | — | — | A | A |
| Ex. 2 | CNF1 0.006 | 1 | 1 | 98 | — | — | — | A | A |
| Ex. 3 | CNF1 0.006 | 1 | 1.2 | 97.8 | — | — | — | A | A |
| Ex. 4 | CNF1 0.006 | 1 | 1.3 | 97.7 | — | — | — | A | A |
| Ex. 5 | CNF1 0.006 | 1 | 1.4 | 97.6 | — | — | — | A | A |
| Ex. 6 | CNF1 0.006 | 1 | 1.8 | 97.2 | — | — | — | A | A |
| Ex. 7 | CF3 0.54 | 0.5 | 1 | 98.5 | — | — | — | B | A |
| Ex. 8 | CNF1 0.006 | 1 | 1 | 97.5 | — | — | 0.5 | A | A |
| Ex. 9 | CNF1 0.006 | 2 | 1.5 | 84.64 | 7.36 | 4 | 0.5 | A | A |
| Ex. 10 | CNF1 0.006 | 2 | 1.5 | 81 | 9 | 6 | 0.5 | A | A |
| Ex. 11 | CNF1 0.006 | 2 | 1.5 | 78.2 | 13.8 | 4 | 0.5 | A | A |
| Com. Ex. 1 | CF1 0.89 | 0.5 | 1 | 98.5 | — | — | — | C | A |
| Com. Ex. 2 | CF2 0.78 | 0.5 | 1 | 98.5 | — | — | — | C | A |

As apparent from the results shown in Table 1, the electrodes of Examples are excellent in surface smoothness and coating property.

Example 12

To 8.1 g of graphite, 0.9 g of nanosilicon, and 0.6 g of acetylene black was added 7.5 g of a 2% by weight aqueous solution of carboxymethyl cellulose (CMC); and stirring and mixing at 2000 rpm for 2 minutes using a planetary mixer was repeated 3 times. To the mixture was added a CNF1 aqueous dispersion, and the resulting mixture was stirred and mixed at 2000 rpm for 2 minutes. Incidentally, the CNF1 aqueous dispersion was prepared by addition of 1.0 g of water to 0.51 g of "CNF1 slurry", stirring and mixing at 2000 rpm for 2 minutes, then further addition of 1.5 g of water, and stirring and mixing at 2000 rpm for 2 minutes.

Water (5.0 g) was added to the resulting mixture and was stirred and mixed at 2000 rpm for 2 minutes, 2.0 g of water was further added thereto and was stirred and mixed at 2000 rpm for 2 minutes, and finally 0.41 g of an aqueous dispersion of SBR having a solid concentration of 48.5% by weight was added thereto and was stirred and mixed at 2000 rpm for 2 minutes.

The resulting slurry having a solid concentration 36.3% by weight was applied on a copper foil having a thickness of 14 μm using an applicator, was dried using a hot plate at 60° C. for 10 minutes, and was then rolled by roll pressing, and was then punched in a circular form having a diameter of 17 mm. The circular sample was dried in a vacuum dryer at 120° C. for 10 hours to form an electrode (basis weight: 5.7 g/cm$^2$, electrode thickness: 40 μm, electrode density: 1.42 g/cm$^3$). The resulting electrode was referred to as "Electrode 1".

Example 13

"CNF1 slurry" (0.51 g) and 1.0 g of water were stirred and mixed at 2000 rpm for 2 minutes using a planetary mixer, 1.5 g of water was further added thereto and was stirred and mixed at 2000 rpm for 2 minutes. To the resulting CNF1 aqueous dispersion was added 0.15 g of carboxymethyl cellulose (CMC) powder; and stirring and mixing at 2000 rpm for 2 minutes was repeated 5 times. To the resulting mixture were added 8.1 g of graphite, 0.9 g of nanosilicon, and 0.6 g of acetylene black; and stirring and mixing at 2000 rpm for 2 minutes was repeated 3 times. To the resulting mixture was added water divided in two portions, 5.0 g and 10.0 g, in a manner that the mixture was stirred and mixed at 2000 rpm for 2 minutes after each addition of water portions. Finally, 0.41 g of an aqueous dispersion of SBR having a solid concentration of 48.5% by weight was added thereto, and the resulting mixture was stirred and mixed at 2000 rpm for 2 minutes.

In the same manner as Example 12 except that the resulting slurry having a solid concentration of 35.5% by weight was used, an electrode (basis weight: 5.7 g/cm$^2$, electrode thickness: 40 μm, electrode density: 1.42 g/cm$^3$ having a copper foil with a thickness of 14 μm was formed. The resulting electrode was referred to as "Electrode 2".

Example 14

"CNF1 slurry" (0.51 g) and 1.0 g of water were stirred and mixed at 2000 rpm for 2 minutes using a planetary mixer, 1.5 g of water was further added thereto and was stirred and mixed at 2000 rpm for 2 minutes. To the resulting CNF1 aqueous dispersion was added 7.5 g of a 2% by weight aqueous solution of carboxymethyl cellulose (CMC); and stirring and mixing at 2000 rpm for 2 minutes was repeated 5 times. To the resulting mixture were added 8.1 g of graphite, 0.9 g of nanosilicon, and 0.6 g of acetylene black; and stirring and mixing at 2000 rpm for 2 minutes was repeated 3 times. To the resulting mixture was added water divided in two portions, 5.0 g and 5.0 g (total 10 g), in a manner that the mixture was stirred and mixed at 2000 rpm for 2 minutes after each addition of water portions. Finally, 0.41 g of an aqueous dispersion of SBR having a solid concentration of 48.5% by weight was added thereto, and the resulting mixture was stirred and mixed at 2000 rpm for 2 minutes.

In the same manner as Example 12 except that the resulting slurry having a solid concentration of 32.8% by weight was used, an electrode (basis weight: 5.6 g/cm$^2$ electrode thickness: 40 μm, electrode density: 1.40 g/cm$^3$ having a copper foil with a thickness of 14 μm was formed. The resulting electrode was referred to as "Electrode 3".

(Production of Battery)

A separator provided with a polyethylene microporous film and a glass nonwoven fabric was placed between Electrode 1 prepared in Example 12 and a lithium metal foil punched in the same size as Electrode 1, an electrolytic solution was introduced between Electrode 1 and the lithium metal foil, and thus obtained product was sealed to prepare a battery element. The resulting battery element was crimped at a pressure of 2 kg/cm$^2$ from the lithium foil side to give a coin battery. This battery was referred to as "Battery 1". As the electrolytic solution was used a solution obtained as follows. To a mixture having ethylene carbonate and ethyl methyl carbonate in a volume ratio of 3:7 were added 10% by volume each of vinylene carbonate and fluoroethylene carbonate, and in the resulting solvent system was dissolved LiPF$_6$ at a concentration of 1 M to give a solution.

In the same manner as the above except that each of Electrode 2 produced in Example 13 and Electrode 3 produced in Example 14 was used instead of Electrode 1 produced in Example 12, coin batteries were produced. A battery in which Electrode 2 produced in Example 13 was used was referred to as "Battery 2", and a battery in which Electrode 3 produced in Example 14 was used was referred to as "Battery 3".

[Charge-Discharge Test]

A theoretical capacity (mAh) was calculated based on the contents of graphite and silicon as an electrode active material contained in a prepared battery. The calculated theoretical capacity was divided by "5" to obtain an amperage (theoretical capacity/5 (mA), hereinafter referred to as 0.2 C). A charging process was started at this amperage and was performed at a constant current until the negative electrode voltage reached 1 mV versus lithium. After the voltage reached 1 mV, the charging process was continued in a constant voltage mode. At the time when the charging current reached one-fourth as large as the original charging current (0.05 C), the charging process was terminated and was switched to a discharging process. The discharging process was performed at a constant current of 0.2 C. At the time when the negative electrode voltage reached 2.0 V versus lithium, the discharging process was terminated. This charge-discharge cycle was defined as one cycle, and 20 cycles were carried out.

The ratio of the discharge capacity of the first cycle relative to the discharge capacity of the 20th cycle in this cycle test was referred to as a discharge capacity retention.

The results of the charge-discharge test are shown in Table 2.

TABLE 2

|  | Electrode | Battery | Discharge capacity (mAh) 1st cycle | Discharge capacity (mAh) 20th cycle | Discharge capacity retention % |
|---|---|---|---|---|---|
| Example 12 | Electrode 1 | 1 | 515 | 443 | 86.0 |
| Example 13 | Electrode 2 | 2 | 471 | 389 | 82.6 |
| Example 14 | Electrode 3 | 3 | 500 | 411 | 82.2 |

As apparent from Table 2, Battery 1 obtained in Example 12 has a high discharge capacity in the initial cycle and the 20th cycle and has a high discharge capacity retention, compared with Batteries 2 and 3 obtained in Examples 13 and 14. From these facts, the premixing (or premix-treatment) of the active material and CMC probably causes coating of the active material with CMC, and then the addition of CNF1 thereto achieves a high battery performance, compared with the addition of the active material to the aqueous dispersion containing CNF1 and CMC.

Comparative Example 3

Using a planetary mixer, 0.15 g of CMC powder, 8.1 g of graphite, 0.9 g of silicon particle, 0.6 g of acetylene black, and 6.0 g of water were stirred and mixed at 2000 rpm for 2 minutes. To the mixture was added 4.0 g of water; and stirring and mixing at 2000 rpm for 2 minutes was repeated 3 times. Thereafter, to the resulting mixture was added 3.0 g of water twice, in a manner that the mixture was stirred and mixed at 2000 rpm for 2 minutes after each water addition. Finally, 0.11 g of an aqueous dispersion of SBR having a solid concentration of 48.5% by weight was added thereto, and the resulting mixture was stirred and mixed at 2000 rpm for 2 minutes.

In the same manner as Example 12 except that the resulting slurry having a solid concentration of 35.9% by weight was used, an electrode (basis weight: 5.5 g/cm$^2$, electrode thickness: 37 μm, electrode density: 1.49 g/cm$^3$ having a copper foil with a thickness of 14 μm was formed. The resulting electrode was referred to as "Electrode 4".

Example 15

Using a planetary mixer, 1.0 g of "CNF1 slurry" and 2.0 g of water were stirred and mixed at 2000 rpm for 2 minutes. Then, to the mixture was added 3.0 g of water, and the resulting mixture was stirred and mixed at 2000 rpm for 2 minutes. To the resulting mixture was added 0.15 g of CMC powder; and stirring and mixing at 2000 rpm for 2 minutes was repeated 5 times. Thereafter, to the resulting mixture were added 8.1 g of graphite, 0.9 g of silicon particle, and 0.6 g of acetylene black; and stirring and mixing at 2000 rpm for 2 minutes was repeated 3 times. To the resulting mixture was added water divided in three portions, 3.0 g, 10.0 g, and 3.0 g, in a manner that the mixture was stirred and mixed at 2000 rpm for 2 minutes after each addition of water portions. Finally, 0.31 g of an aqueous dispersion of SBR having a solid concentration of 48.5% by weight was added thereto, and the resulting mixture was stirred and mixed at 2000 rpm for 2 minutes.

In the same manner as Example 12 except that the resulting slurry having a solid concentration of 31.2% by weight was used, an electrode (basis weight: 5.7 g/cm$^2$, electrode thickness: 40 μm, electrode density: 1.42 g/cm$^3$ having a copper foil with a thickness of 14 μm was formed. The resulting electrode was referred to as "Electrode 5".

Example 16

Using a planetary mixer, 0.51 g of "CNF1 slurry" and 1.0 g of water were stirred and mixed at 2000 rpm for 2 minutes. Then, to the mixture was added 1.5 g of water. and the resulting mixture was stirred and mixed at 2000 rpm for 2 minutes. To the resulting mixture was added 0.15 g of CMC powder; and stirring and mixing at 2000 rpm for 2 minutes was repeated 5 times. To the resulting mixture were added 8.1 g of graphite, 0.9 g of silicon particle, and 0.6 g of acetylene black; and stirring and mixing at 2000 rpm for 2 minutes was repeated 3 times. To the resulting mixture was added water divided in two portions, 5.0 g and 10.0 g, in a manner that the mixture was stirred and mixed at 2000 rpm for 2 minutes after each addition of water portions. Finally, 0.41 g of an aqueous dispersion of SBR having a solid concentration of 48.5% by weight was added thereto, and the resulting mixture was stirred and mixed at 2000 rpm for 2 minutes.

In the same manner as Example 12 except that the resulting slurry having a solid concentration of 35.5% by weight was used, an electrode (basis weight: 5.7 g/cm$^2$, electrode thickness: 40 μm, electrode density: 1.42 g/cm$^3$ having a copper foil with a thickness of 14 μm was formed. The resulting electrode was referred to as "Electrode 6".

(Peel Strength)

For "Electrode 5" obtained in Example 15, "Electrode 6" obtained in Example 16, and "Electrode 4" obtained in Comparative Example 3, the peel strength was measured by the following adhesion test.

[Adhesion Test]

Using each of negative electrode plates produced in Examples and Comparative Examples, a peel strength between a copper foil as a current collector and a negative electrode coating layer was measured in accordance with Japanese Industrial Standard (JIS) K6854-1. The test sample had a width of 25 mm and a length of 90 mm at which the copper foil adhered to the negative electrode coating layer. In a peel test, a non-adhesion end of the copper foil (a portion having no adhesion to the negative electrode coating layer) was pulled to determine a peel strength.

The results are shown in Table 3.

TABLE 3

|  | Electrode No. | CNF concentration (% by weight) | Peel strength (N/m) |
|---|---|---|---|
| Example 15 | 5 | 1.0 | 3.8 |
| Example 16 | 6 | 0.5 | 3.3 |
| Comparative Example 3 | 4 | 0 | 2.7 |

The comparison of Examples 15 and 16 with Comparative Example 3 clearly shows that a higher CNF1 concentration improves the peel strength.

INDUSTRIAL APPLICABILITY

The electrode slurry (slurry composition) of the present invention is suitably used for an electrode of a non-aqueous secondary battery such as a lithium-ion battery or a polymer lithium-ion battery. In particular, the lithium-ion battery provided with the electrode obtained from the electrode slurry (slurry composition) of the present invention has a high adhesion between the electrode active material layer and the current collector and a high charge-discharge capacity, and is thus utilizable in various fields including electric equipment (particularly, mobile equipment such as mobile phone equipment or portable equipment), electric vehicles, and hybrid electric vehicles (HEV).

The invention claimed is:

1. An electrode slurry comprising:
   (A) a cellulose fiber,
   (B) a carboxymethyl-group-containing cellulose ether or a salt thereof, and
   a particulate material containing at least (C) an electrode active material,
   the cellulose fiber (A) having an average fiber length of 5 to 750 μm and an average fiber diameter of 1 nm to 10 μm,
   the electrode active material (C) contains (C1) a carbonaceous particle and (C2) a silicon particle, and
   a ratio $D_c/D_{si}$ of the average particle size $D_c$ of the carbonaceous particle (C1) relative to the average particle size $D_{si}$ of the silicon particle (C2) is about 5 to 1000.

2. The electrode slurry according to claim 1, wherein, in terms of solid content, an amount of the carboxymethyl-group-containing cellulose ether or the salt thereof (B) is 0.1 to 3 parts by weight based on 100 parts by weight of a total amount of the cellulose fiber (A), the carboxymethyl-group-containing cellulose ether or the salt thereof (B), and the electrode active material (C).

3. The electrode slurry according to claim 1, wherein, in terms of solid content, a total content of the cellulose fiber (A) and the carboxymethyl-group-containing cellulose ether or the salt thereof (B) is 1 to 4.5 parts by weight based on 100 parts by weight of a total amount of the cellulose fiber (A), the carboxymethyl-group-containing cellulose ether or the salt thereof (B), and the electrode active material (C).

4. The electrode slurry according to claim 1, wherein a ratio of the cellulose fiber (A) relative to the carboxymethyl-group-containing cellulose ether or the salt thereof (B) is 95/5 to 20/80 in the former/the latter (weight ratio) in terms of solid content.

5. The electrode slurry according to claim 1, wherein the average fiber length of the cellulose fiber (A) is 5 to 100 μm.

6. The electrode slurry according to claim 1, wherein the carboxymethyl-group-containing cellulose ether or the salt thereof (B) contains a carboxymethyl cellulose or a salt thereof.

7. The electrode slurry according to claim 1, wherein the electrode active material (C) is coated with the carboxymethyl-group-containing cellulose ether or the salt thereof (B).

8. The electrode slurry according to claim 1, wherein the weight ratio of the carbonaceous particle (C1) relative to the silicon particle (C2) is 93/7 to 85/15 in the former/the latter.

9. The electrode slurry according to claim 1, wherein a total content of the cellulose fiber (A), the carboxymethyl-group-containing cellulose ether or the salt thereof (B), and the particulate material containing at least the electrode active material (C) is not more than 60% by weight based on the whole slurry.

10. The electrode slurry according to claim 1, wherein the cellulose fiber (A) has the average fiber length of 5 to 50 μm and the average fiber diameter of 5 nm to 2.5 μm.

11. The electrode slurry according to claim 1, wherein in terms of solid content, a ratio of the cellulose fiber (A) relative to the carboxymethyl-group-containing cellulose or the salt thereof (B) is 75/25 to 35/65 in the former/the latter (weight ratio), and
    the average fiber length of the cellulose fiber (A) is 5 to 100 μm.

12. A process for producing a slurry composition containing (A) a cellulose fiber, (B) a carboxymethyl-group-containing cellulose ether or a salt thereof, and a particulate material containing at least (C) an electrode active material, the process comprising: treating at least the electrode active material (C) with the carboxymethyl-group-containing cellulose ether or the salt thereof (B), and mixing the treated product and the cellulose fiber (A) having an average fiber length of 5 to 750 μm and an average fiber diameter of 1 nm to 10 μm,
    wherein the electrode active material (C) contains (C1) a carbonaceous particle and (C2) a silicon particle, and
    a ratio $D_c/D_{si}$ of the average particle size $D_c$ of the carbonaceous particle (C1) relative to the average particle size Ds, of the silicon particle (C2) is about 5 to 1000.

13. The process according to claim 12, wherein the particulate material further contains (D) a conductive auxiliary, wherein the electrode active material (C) and the conductive auxiliary (D) are treated with the carboxymethyl-group-containing cellulose ether or the salt thereof (B), and the treated product and the cellulose fiber (A) are mixed.

14. The process according to claim 12, wherein the weight ratio of the carbonaceous particle (C1) relative to the silicon particle (C2) is 93/7 to 85/15 in the former/the latter.

15. The process according to claim 12, which comprises: mixing (C) an electrode active material containing the carbonaceous particle (C1) and the silicon particle (C2) in a ratio of the former/the latter of 99/1 to 50/50 (weight ratio), (D) a conductive auxiliary, and (B) a carboxymethyl cellulose or a salt thereof to prepare an aqueous mixture, and mixing the aqueous mixture and (A) an aqueous dispersion containing a cellulose nanofiber having a nanometer-sized average fiber diameter to prepare a slurry composition, wherein
    in terms of solid content, an amount of the carboxymethyl cellulose or the salt thereof (B) based on 100 parts by weight of the electrode active material (C) is 0.1 to 4 parts by weight, and
    in terms of solid content, a ratio of the cellulose nanofiber (A) relative to the carboxymethyl cellulose or the salt thereof (B) is 95/5 to 5/95 in the former/the latter (weight ratio).

16. The process according to claim 12, wherein in terms of solid content, a ratio of the cellulose fiber (A) relative to the carboxymethyl-group-containing cellulose or the salt thereof (B) is 75/25 to 35/65 in the former/the latter (weight ratio), and
    the average fiber length of the cellulose fiber (A) is 5 to 100 μm.

17. A non-aqueous secondary battery comprising:
    a non-aqueous secondary battery electrode comprising a current collector and an electrode active material layer on at least one surface of the current collector, wherein
    the electrode active material layer containing (A) a cellulose fiber having an average fiber length of 5 to 750 μm and an average fiber diameter of 1 nm to 10 μm, (B) a carboxymethyl-group-containing cellulose ether or a salt thereof, and a particulate material containing at least (C) an electrode active material,
    wherein the electrode active material (C) contains (C1) a carbonaceous particle and (C2) a silicon particle, and a ratio $D_c/D_{si}$ of the average particle size $D_c$ of the carbonaceous particle (C1) relative to the average particle size Ds, of the silicon particle (C2) is about 5 to 1000.

18. The non-aqueous secondary battery according to claim 17, wherein in terms of solid content, a ratio of the cellulose fiber (A) relative to the carboxymethyl-group-containing cellulose or the salt thereof (B) is 75/25 to 35/65 in the former/the latter (weight ratio), and
the average fiber length of the cellulose fiber (A) is 5 to 100 μm.

\* \* \* \* \*